(12) United States Patent
Sakakibara

(10) Patent No.: US 10,804,811 B2
(45) Date of Patent: Oct. 13, 2020

(54) CONTROL DEVICE FOR DIRECT POWER CONVERTER FOR REDUCTION OF HARMONIC DISTORTION

(71) Applicant: DAIKIN INDUSTRIES, LTD., Osaka-Shi, Osaka (JP)

(72) Inventor: Kenichi Sakakibara, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 16/336,586

(22) PCT Filed: Sep. 27, 2017

(86) PCT No.: PCT/JP2017/034929
§ 371 (c)(1),
(2) Date: Mar. 26, 2019

(87) PCT Pub. No.: WO2018/062261
PCT Pub. Date: Apr. 5, 2018

(65) Prior Publication Data
US 2019/0222135 A1    Jul. 18, 2019

(30) Foreign Application Priority Data

Sep. 30, 2016   (JP) ................................. 2016-192704

(51) Int. Cl.
*H02M 5/458*    (2006.01)
*H02M 7/06*     (2006.01)
(Continued)

(52) U.S. Cl.
CPC ........... *H02M 5/4585* (2013.01); *H02M 1/12* (2013.01); *H02M 5/458* (2013.01); *H02M 7/06* (2013.01);
(Continued)

(58) Field of Classification Search
CPC ........ H02M 5/4585; H02M 1/12; H02M 7/06; H02M 7/53871
See application file for complete search history.

(56) References Cited

U.S. PATENT DOCUMENTS 9,219,434 B2 *  12/2015  Kashihara ............. H02P 27/085
9,450,502 B2      9/2016  Sakakibara
(Continued)

FOREIGN PATENT DOCUMENTS

JP    2011-50159 A     3/2011
JP    2014-096976 A    5/2014
(Continued)

OTHER PUBLICATIONS

International Search Report (PCT/ISA/210) issued in PCT/JP2017/034929, dated Dec. 5, 2017.
(Continued)

*Primary Examiner* — Kyle J Moody
*Assistant Examiner* — Lakaisha Jackson
(74) *Attorney, Agent, or Firm* — Birch, Stewart, Kolasch & Birch, LLP

(57) ABSTRACT

A duty calculating unit receives a phase, an amplitude, a command value of a voltage across a capacitor, and a command value of a DC voltage, and calculates an original discharge duty and an original rectification duty. A duty correcting unit corrects the original discharge duty and the original rectification duty to obtain a discharge duty and a rectification duty. The duty calculating unit and the duty correcting unit can collectively be regarded as a duty generating unit that generates the discharge duty and the rectification duty.

17 Claims, 25 Drawing Sheets

(51) Int. Cl.
*H02M 1/12* (2006.01)
*H02M 7/5387* (2007.01)
*H02M 7/12* (2006.01)
*H02M 7/48* (2007.01)

(52) U.S. Cl.
CPC ............... *H02M 7/12* (2013.01); *H02M 7/48* (2013.01); *H02M 7/53871* (2013.01)

(56) References Cited

U.S. PATENT DOCUMENTS

| | | | |
|---|---|---|---|
| 9,654,019 | B2 | 5/2017 | Sakakibara |
| 9,780,683 | B2 | 10/2017 | Sakakibara et al. |
| 9,906,156 | B2 | 2/2018 | Sakakibara |
| 2012/0327694 | A1* | 12/2012 | Satou ................... H02M 5/4585 363/37 |
| 2015/0280601 | A1 | 10/2015 | Sakakibara |
| 2016/0233782 | A1 | 8/2016 | Sakakibara |
| 2017/0310235 | A1 | 10/2017 | Sakakibara |
| 2017/0324348 | A1 | 11/2017 | Yamashita |
| 2018/0212510 | A1* | 7/2018 | Takahashi ............. H02M 1/083 |
| 2018/0287490 | A1* | 10/2018 | Yuasa ..................... F25B 31/02 |
| 2019/0128555 | A1* | 5/2019 | Takeda .................... H02M 1/12 |

FOREIGN PATENT DOCUMENTS

| | | | |
|---|---|---|---|
| JP | 2015-065731 | A | 4/2015 |
| JP | 5772915 | B2 | 9/2015 |
| JP | 5794273 | B2 | 10/2015 |
| JP | 5804167 | B2 | 11/2015 |
| JP | 5874800 | B1 | 3/2016 |
| JP | 2016-082680 | A | 5/2016 |
| JP | 2016-82680 | A | 5/2016 |
| JP | 2016-103961 | A | 6/2016 |
| JP | 2016-119835 | A | 6/2016 |

OTHER PUBLICATIONS

Saito, Makoto, "A Single to Three Phase Matrix Converter for Vector Controlled Induction Motor", The Institute of Electrical Engineers of Japan Industry Applications Society Conference 2007, 1-04-5, 2007, pp. I-103 to I-108.

Sakakibara et al., "Application of an Indirect Matrix Converter for Air Conditioners", The Transactions of the Institute of Electrical Engineers of Japan D, vol. 136, No. 7, 2016, pp. 471-478.

Suga et al., "A Simple Switching Method for A Improved Power Factor Type Single Phase Converter", The Transactions of the Institute of Electrical Engineers of Japan, vol. 116-D, No. 4, 1996, pp. 420-426.

Uesgi et al., "Single-Phase Twice voltage PFC Converter for air conditioner", The Transactions of the Institute of Electrical Engineers of Japan, vol. 119-D, No. 5, 1999, pp. 592-598.

Written Opinion (PCT/ISA/237) issued in PCT/JP2017/034929, dated Dec. 5, 2017.

Yamashita et al., "A control method of a single-phase-to-three-phase power converter with an active buffer for increasing voltage transfer ratio", The Institute of Electrical Engineers of Japan Industry Applications Society Conference 2016, 1-54, 2016, pp. I-181 to I-186.

* cited by examiner

F I G. 3
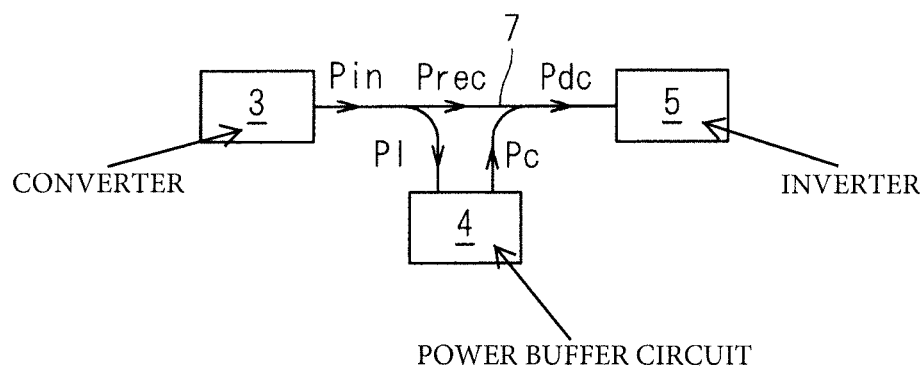
F I G. 4
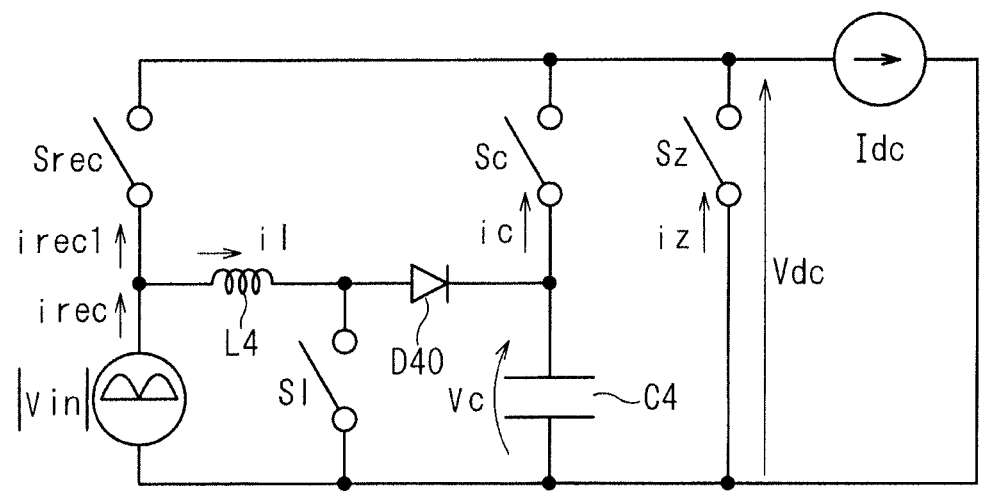

F I G. 6
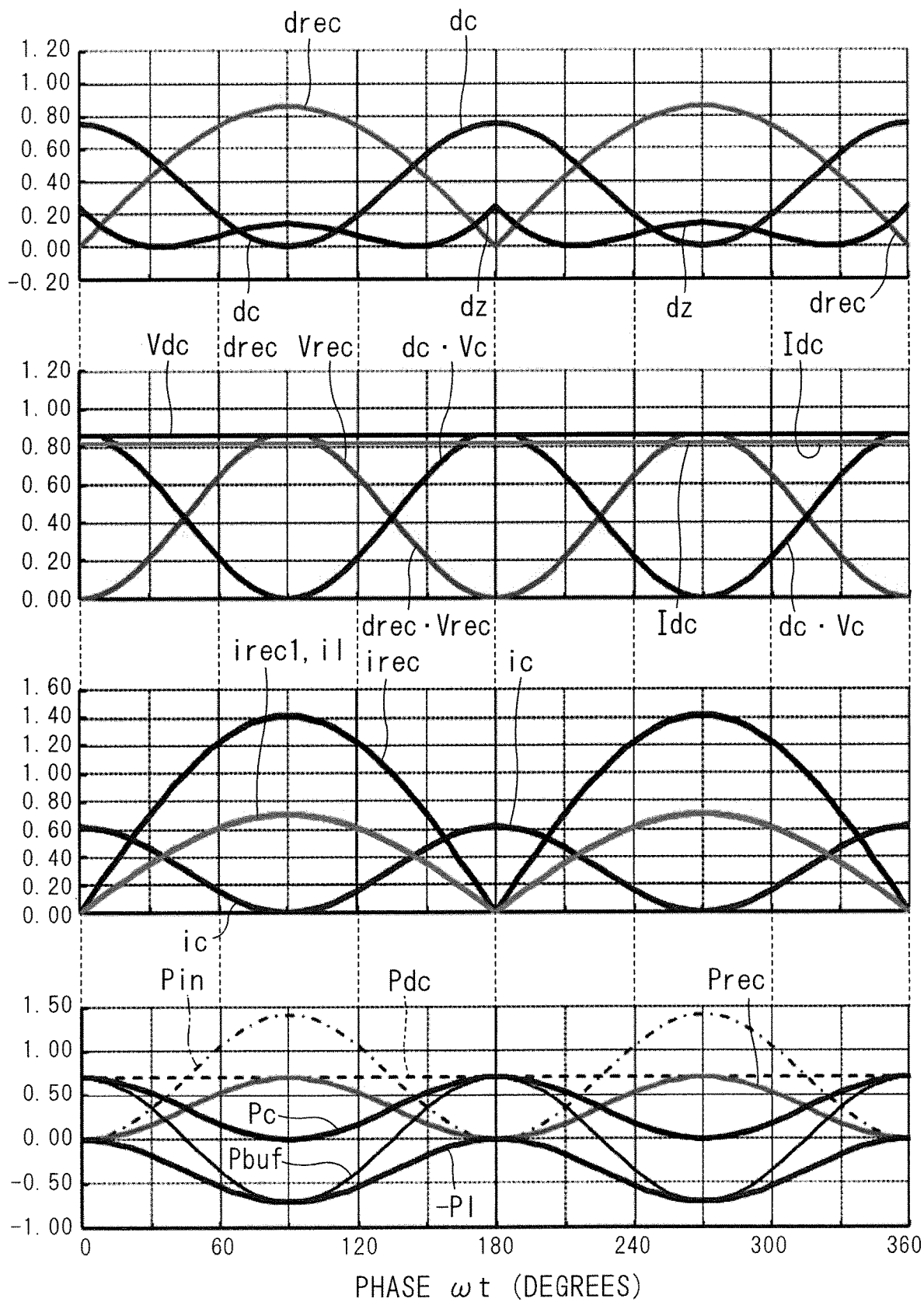

PHASE ωt (DEGREES)

PHASE ωt (DEGREES)

F I G  1 5
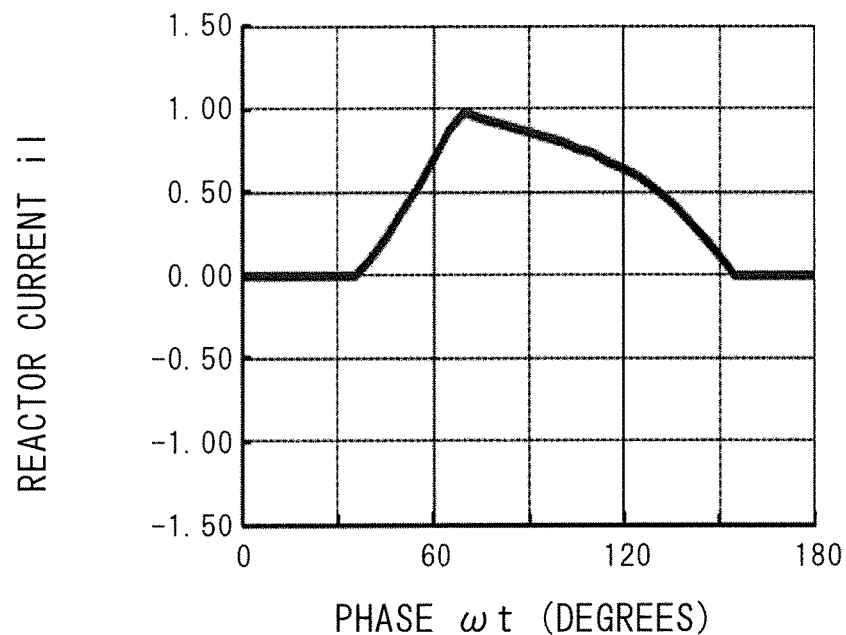
F I G. 1 6
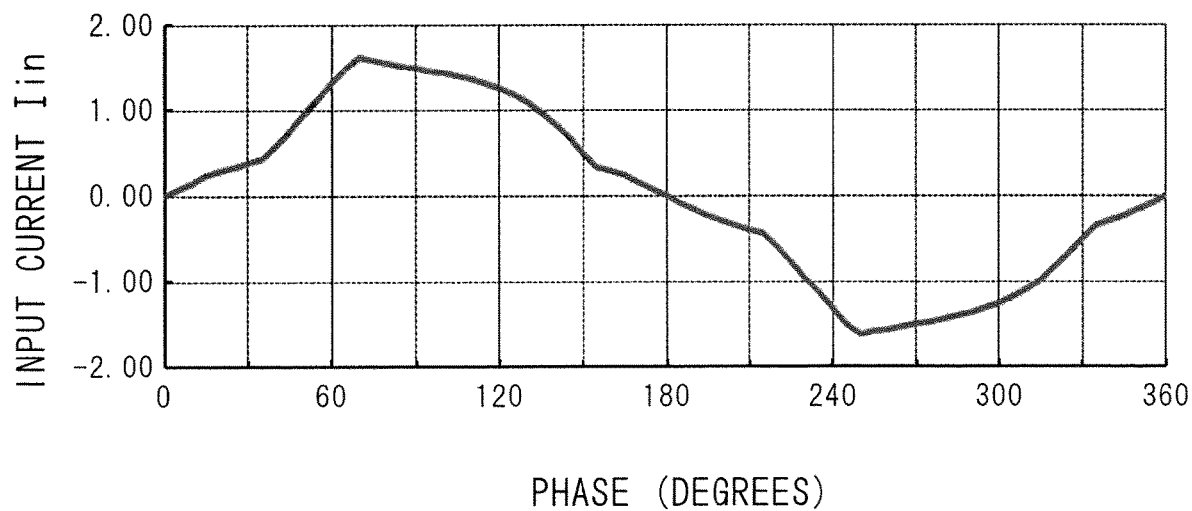

PHASE ωt (DEGREES)

F I G . 2 0
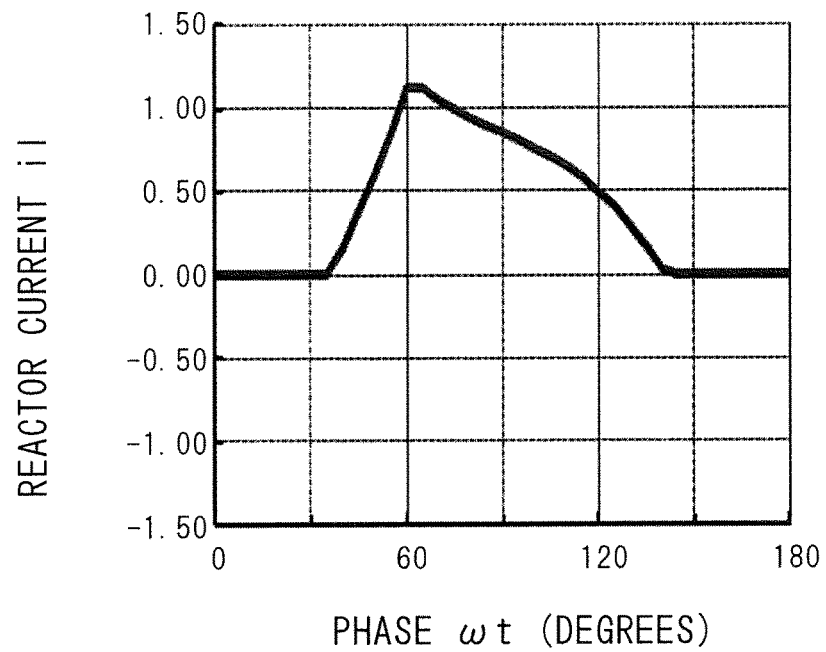
F I G . 2 1
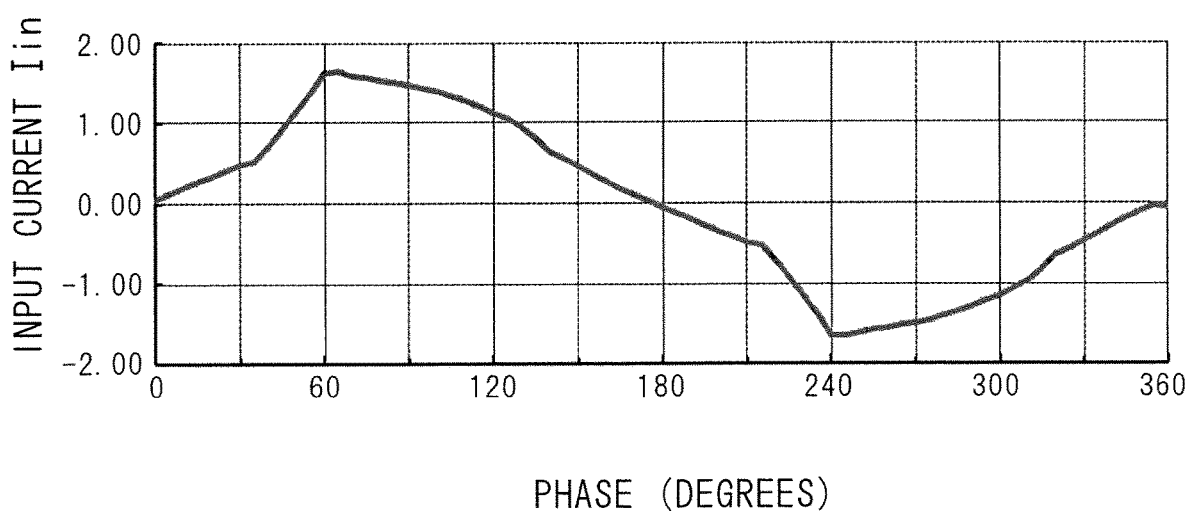

F I G . 2 5
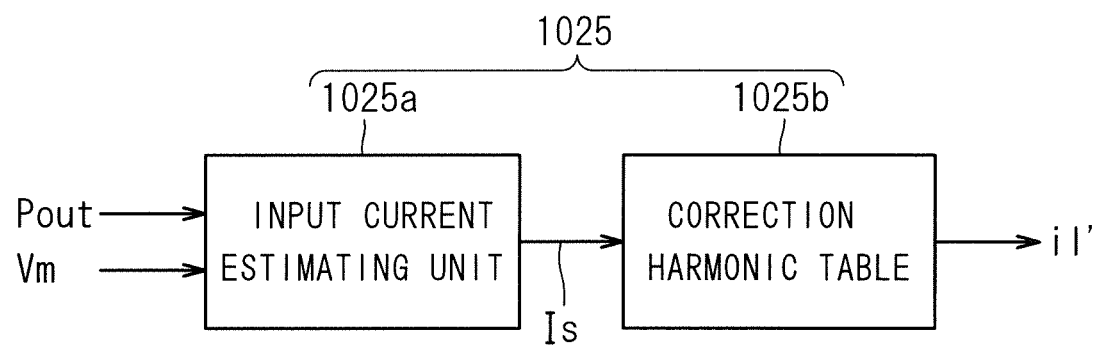

CONTROL DEVICE FOR DIRECT POWER CONVERTER FOR REDUCTION OF HARMONIC DISTORTION

TECHNICAL FIELD

The present invention relates to a technique for controlling a direct power converter.

BACKGROUND ART

Power obtained from a single-phase AC power supply contains a component that ripples at a frequency twice a power supply frequency. Thus, a large-capacitance energy accumulation element is required to obtain a constant DC voltage by using a rectifying circuit.

In response to such a requirement, there has been proposed a technique for connecting a capacitor constituting an active buffer to a DC link through a switching element, thereby constituting a voltage source. Such a configuration forms a high-frequency link together with a power supply voltage and achieves high-efficiency characteristics with a sinusoidal input current in a direct power conversion circuit (for example, Japanese Patent No. 5804167, Japanese Patent No. 5874800 and Yamashita, Sakakibara, "A control method of a single-phase-to-three-phase power converter with an active buffer for increasing voltage transfer ratio", the Institute of Electrical Engineers of Japan Industry Applications Society Conference 2016, 1-54, pp. I-181 to I-186, 2016).

In this technique, the waveform of a current flowing through the active buffer (hereinafter also referred to as a "buffer current") is basically sinusoidal. The control of such a buffer current is described in, for example, Japanese Patent No. 5874800 and Yamashita, Sakakibara, "A control method of a single-phase-to-three-phase power converter with an active buffer for increasing voltage transfer ratio", the Institute of Electrical Engineers of Japan Industry Applications Society Conference 2016, 1-54, pp. I-181 to I-186, 2016. A circuit that supplies a buffer current performs proportional-integral (PI) control on a deviation between an actual value of a capacitor voltage and a command value of the capacitor voltage. The amplitude of the buffer current is determined on the basis of the waveform of an input current and the buffer current is realized by a switching operation such as a critical mode and a continuous mode.

Saito, "A Single to Three Phase Matrix Converter for Vector Controlled Induction Motor", the Institute of Electrical Engineers of Japan Industry Applications Society Conference 2007, 1-O4-5, pp. I-103 to I-108, 2007 proposes a scheme based on a matrix converter as a single-phase to three-phase conversion circuit including a buffer circuit. The scheme requires a large circuit scale because the scheme is based on three-phase to three-phase conversion, but is characterized in that the responsibility for taking measures against noise for a PWM rectifier is significantly decreased, as described in Sakakibara and four others, "Application of an Indirect Matrix Converter for Air Conditioners", The transactions of the Institute of Electrical Engineers of Japan D, Vol. 136, No. 7, pp. 471-478, 2016.

The above-described scheme using an active buffer requires a simple configuration, but the charge circuit involves a switching operation. A component needs to be added to take measures against noise resulting from the switching operation, which may become a factor of degrading the characteristic of a simple configuration.

Suga, Kimata, Uchida, "A Simple Switching Method for A Improved Power Factor Type Single Phase Converter", The transactions of the Institute of Electrical Engineers of Japan D, Vol. 116, No. 4, pp. 420-426, 1996 and Uesgi and four others, "Single-Phase Twice voltage PFC Converter for air conditioner", The transactions of the Institute of Electrical Engineers of Japan D, Vol. 119, No. 5, pp. 592-598, 1999 propose switching for simply controlling a charging current (hereinafter also referred to as "simple switching" according to Suga, Kimata, Uchida, "A Simple Switching Method for A Improved Power Factor Type Single Phase Converter", The transactions of the Institute of Electrical Engineers of Japan D, Vol. 116, No. 4, pp. 420-426, 1996, called "partial switching" in Uesgi and four others, "Single-Phase Twice voltage PFC Converter for air conditioner", The transactions of the Institute of Electrical Engineers of Japan D, Vol. 119, No. 5, pp. 592-598, 1999). In simple switching, the number of switching operations is smaller than that in a scheme using a conventional active buffer, and thus the occurrence of noise is reduced.

Japanese Patent No. 5794273, Japanese Patent Application Laid-Open No. 2016-103961 and Japanese Patent No. 5772915 describe known techniques which will be described in an embodiment.

SUMMARY OF INVENTION

Problems to be Solved by the Invention

However, the waveform of a charging current obtained through simple switching is greatly distorted from a sinusoidal waveform. In the prior art introduced above, the waveform of a charging current is basically sinusoidal. If a charging current obtained through simple switching is used as is, the waveform of an input current is greatly distorted.

Accordingly, an object of the present invention is to provide a technique for maintaining the function of a power buffer and reducing distortion of the waveform of an input current from a sinusoidal waveform even when the waveform of a buffer current is distorted from a sinusoidal waveform.

Means to Solve the Problems

The present invention is a control device (10) for a direct power converter, which controls the direct power converter. The direct power converter includes a DC link (7) including a first DC power supply line (LH; LH1, LH2) and a second DC power supply line; a converter (3) that receives a single-phase AC voltage (Vin) and outputs a ripple power (Pin) to the DC link; a power buffer circuit (4) that supplies and receives a power (Pc, Pl) to and from the DC link; and an inverter (5) that converts a DC voltage between the first DC power supply line and the second DC power supply line to an AC voltage.

The converter (3) applies a rectified voltage (Vrec) obtained by full-wave rectifying the single-phase AC voltage (Vin) to the DC link (7) such that the first DC power supply line (LH; LH1, LH2) is higher in potential than the second DC power supply line (LL).

According to a first aspect, the control device includes a duty generating unit (1021, 1023) that generates a rectification duty (drec', drec") which is a duty at which a first current (irec1) flows from the converter to the DC link and a discharge duty (dc', dc") which is a duty at which a second current (ic) flows from the power buffer circuit to the DC link; and an inverter controller (101) that outputs an inverter control signal (SSup, SSvp, SSwp, SSun, SSvn, SSwn) that controls an operation of the inverter on the basis of the rectification duty, the discharge duty, and a command value (Vu*, Vv*, Vw*) of a voltage output from the inverter.

The rectification duty is set on the basis of a product of a first ratio (Vdc/Vm) of a predetermined voltage (Vdc) to an amplitude (Vm) of the AC voltage and an absolute value ($|\sin(\omega t)|$) of a sinusoidal value of a phase ($\omega t$) of the AC voltage, and a second ratio (il/Idc, il'/Idc) of a third current (il, il') to a DC current (Idc) flowing through the inverter. The third current is a fourth current (il) input to the power buffer circuit from the DC link or an amount of reduction (il') of a harmonic component of the fourth current.

A second aspect and a third aspect of the control device for the direct power converter according to the present invention are related to the first aspect, and in the second aspect, the converter (3) applies the rectified voltage (Vrec) obtained by full-wave rectifying the single-phase AC voltage (Vin) to the DC link (7) such that the first DC power supply line (LH; LH1, LH2) is higher in potential than the second DC power supply line (LL). The power buffer circuit (4) includes a discharge circuit (4a) including a capacitor (C4) and a first switch (Sc, D42) that is connected in series to the capacitor between the first DC power supply line and the second DC power supply line and is closer to the first DC power supply line than the capacitor is, and a charge circuit (4b) that charges the capacitor.

According to the second aspect, the control device outputs a discharge switch signal (SSc) that brings the first switch into conduction on the basis of the discharge duty (dc'), and the discharge duty is set on the basis of a product of a third ratio (Vdc/Vc) of the predetermined voltage (Vdc) to a voltage (Vc, Vc*) across the capacitor and a cosine value ($\cos(2\omega t)$) of a value twice the phase ($\omega t$) of the AC voltage, and a product of a fourth ratio (Vm/Vc) of the amplitude (Vm) to the voltage across the capacitor, the second ratio (il/Idc), and the absolute value ($|\sin(\omega t)|$) of the sinusoidal value. The third current is the fourth current (il).

According to the third aspect, the control device outputs a discharge switch signal (SSc) that brings the first switch into conduction on the basis of the discharge duty (dc"), and the discharge duty is set on the basis of a product of a third ratio (Vdc/Vc) of the predetermined voltage (Vdc) to a voltage (Vc, Vc*) across the capacitor and a square ($\cos^2(\omega t)$) of a cosine value of the phase ($\omega t$) of the AC voltage, and a product of a fourth ratio (Vm/Vc) of the amplitude (Vm) to the voltage across the capacitor, the second ratio (il'/Idc), and the absolute value ($|\sin(\omega t)|$) of the sinusoidal value. The third current is the amount of reduction (il') of the harmonic component of the fourth current (il).

For example, the control device (10) further includes an amount-of-correction generating unit (1025) that obtains the amount of reduction (il') on the basis of a harmonic component of an input current (Iin) input to the converter (3). Alternatively, the control device (10) further includes an amount-of-correction generating unit (1026) that obtains the amount of reduction (il') on the basis of the harmonic component of the fourth current (il).

For example, the duty generating unit includes a duty calculating unit (1021) that obtains an original rectification duty (drec), which is a product of the first ratio (Vdc/Vm) and the absolute value ($|\sin(\omega t)|$) of the sinusoidal value, and an original discharge duty (dc), which is a product of the third ratio (Vdc/Vc) and a square ($\cos^2(\omega t)$) of a cosine value of the phase ($\omega t$) of the AC voltage, and a duty correcting unit (1023) that performs correction based on the second ratio (il/Idc) to obtain the rectification duty (drec', drec") from the original rectification duty and the discharge duty (dc', dc") from the original discharge duty.

A fourth aspect of the control device for the direct power converter according to the present invention is related to the second aspect or the third aspect, and in the fourth aspect, the charge circuit (4b) includes a diode (D40) including a cathode connected to the capacitor (C4) and an anode, a reactor (L4) connected between the first DC power supply line (LH; LH1, LH2) and the anode, and a second switch (Sl, D41) connected between the second DC power supply line (LL) and the anode. According to the third aspect, the control device further includes a switch control signal generating unit (1031) that generates a control signal (SSl) that causes the second switch to be turned on once and turned off once in one period of the rectified voltage (Vrec).

Effects of the Invention

According to the first aspect of the control device for the direct power converter according to the present invention, distortion of the waveform of an input current from a sinusoidal waveform is reduced regardless of the waveform of the third current.

According to the second aspect or the third aspect of the control device for the direct power converter according to the present invention, power output from the inverter is smoothed regardless of the waveform of the third current.

According to the fourth aspect of the control device for the direct power converter according to the present invention, noise generated by the second switch is reduced.

The objects, features, aspects, and advantages of the present invention will become more apparent from the detailed description given below and the attached drawings.

BRIEF DESCRIPTION OF DRAWINGS

FIG. 3 is a block diagram schematically illustrating the input and output of power to and from the direct power converter;

FIG. 4 is an equivalent circuit diagram of the direct power converter;

FIG. 6 includes graphs showing an operation of the direct power converter;

FIG. 15 is a graph showing the waveform of a reactor current in a half-period of a single-phase AC voltage;

FIG. 16 is a graph showing the waveform of an input current;

FIG. 20 is a graph showing the waveform of a reactor current in a half-period of a single-phase AC voltage;

FIG. 21 is a graph showing the waveform of an input current;

FIG. 25 is a block diagram exemplifying the configuration of an amount-of-correction generating unit;

DESCRIPTION OF EMBODIMENTS

A. Configurations of Power Converter and Control Device Therefor

Figure 1:
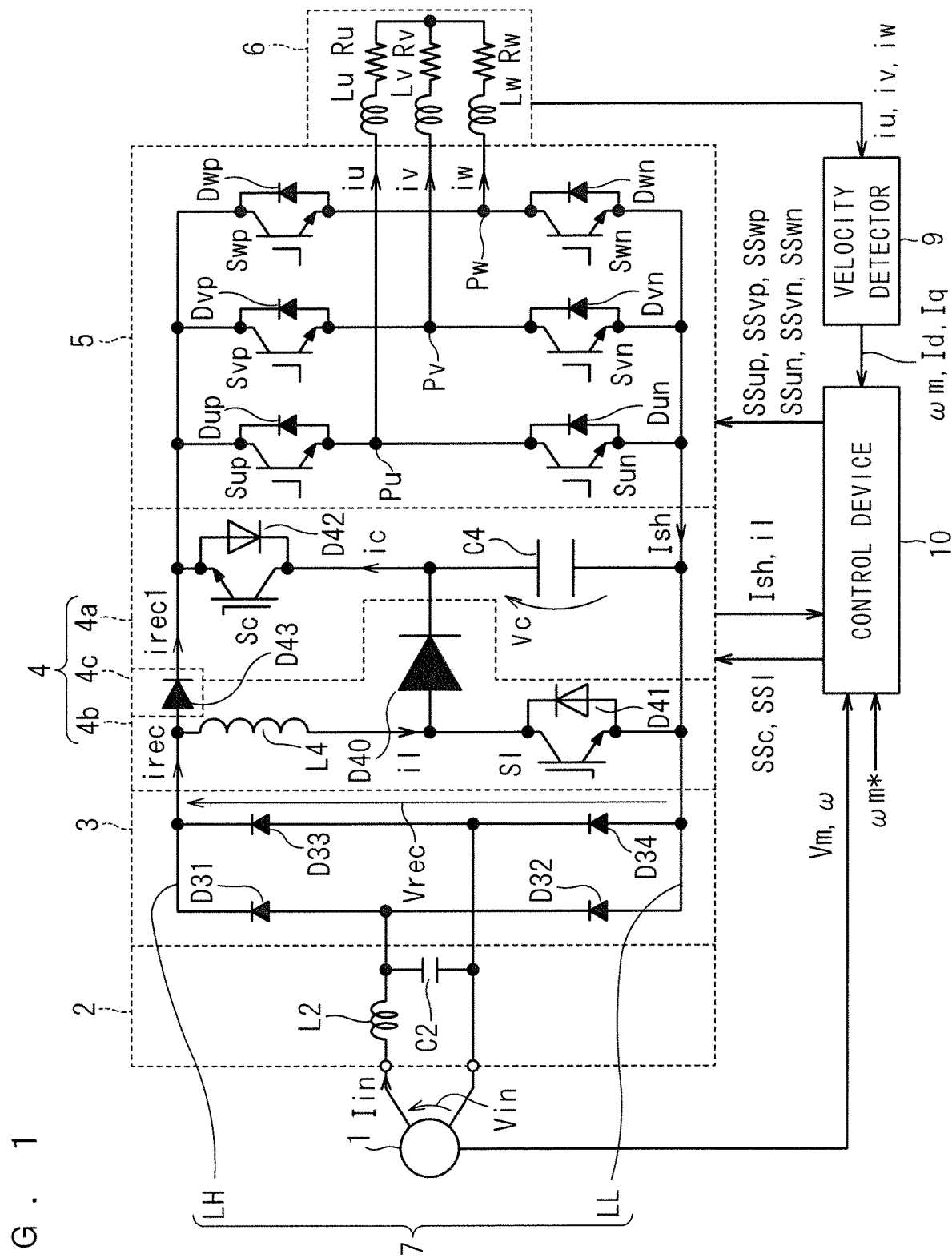
FIG. 1 is a block diagram illustrating the configuration of a direct power converter to which a control technique according to the present invention can be applied.

FIG. 1 is a block diagram illustrating the configuration of a direct power converter to which a control technique according to the present invention can be applied. The direct power converter includes a converter 3, a power buffer circuit 4, an inverter 5, and a DC link 7. The power buffer circuit 4 functions as the above-described active buffer.

The converter 3 is connected to a single-phase AC power supply 1, for example, through a filter 2. The filter 2 includes a reactor L2 and a capacitor C2. The reactor L2 is provided between the converter 3 and one of two output terminals of the single-phase AC power supply 1. The capacitor C2 is provided between the two output terminals of the single-phase AC power supply 1. The filter 2 removes, from a current, a high-frequency component mainly derived from a switching operation of the inverter 5. The filter 2 may be omitted or may be provided between the converter 3 and the power buffer circuit 4. The position of the filter 2 will be described below in a second modification. For the sake of simplicity, the function of the filter 2 will be disregarded in the following description.

The DC link 7 includes DC power supply lines LH and LL.

The converter 3 adopts, for example, a diode bridge, and includes diodes D31 to D34. The diodes D31 to D34 constitute a bridge circuit that single-phase full-wave rectifies a single-phase AC voltage Vin, which is an input voltage input from the single-phase AC power supply 1, to convert the single-phase AC voltage Vin to a rectified voltage Vrec (=|Vin|; Vin=Vm·sin(ωt)), and outputs the rectified voltage Vrec between the DC power supply lines LH and LL. A potential applied to the DC power supply line LH is higher than a potential applied to the DC power supply line LL. An input current Iin flows from the single-phase AC power supply 1 into the converter 3. The converter 3 outputs a current irec (=|Iin|; Iin=Im·sin(ωt)).

The power buffer circuit 4 includes a discharge circuit 4a, a charge circuit 4b, and a current blocking circuit 4c, and supplies power to and receives power from the DC link 7. The discharge circuit 4a includes a capacitor C4 as a buffer capacitor. The charge circuit 4b boosts the rectified voltage Vrec to charge the capacitor C4. The current blocking circuit 4c blocks a current flowing from the discharge circuit 4a toward the charge circuit 4b.

The discharge circuit 4a further includes a diode D42 and a transistor (here, an insulated gate bipolar transistor: hereinafter abbreviated as "IGBT") Sc connected in antiparallel to the diode D42. The transistor Sc is connected in series to the capacitor C4 between the DC power supply lines LH and LL and is closer to the DC power supply line LH than the capacitor C4 is.

Here, antiparallel connection means parallel connection in which forward directions are opposite to each other. Specifically, the forward direction of the transistor Sc is a direction from the DC power supply line LL toward the DC power supply line LH, and the forward direction of the diode D42 is a direction from the DC power supply line LH toward the DC Power supply line LL. The transistor Sc and the diode D42 can collectively be regarded as a single switch element (switch Sc). Conduction of the switch Sc causes the capacitor C4 to discharge and supply power to the DC link 7.

The charge circuit 4b includes, for example, a diode D40, a reactor L4, and a transistor (here, an IGBT) Sl. The diode D40 includes a cathode and an anode. The cathode is connected between the switch Sc and the capacitor C4. This configuration is known as a so-called boost chopper.

The reactor L4 is connected between the DC power supply line LH and the anode of the diode D40. The transistor Sl is connected between the DC power supply line LL and the anode of the diode D40. The transistor Sl is connected in antiparallel to a diode D41. The transistor Sl and the diode D41 can collectively be regarded as a single switch element (switch Sl). Specifically, the forward direction of the transistor Sl is a direction from the DC power supply line LH toward the DC power supply line LL, and the forward direction of the diode D41 is a direction from the DC power supply line LL toward the DC power supply line LH.

The capacitor C4 is charged by the charge circuit 4b to generate a voltage Vc across the capacitor C4, the voltage Vc being higher than the rectified voltage Vrec. Specifically, a current is caused to flow from the DC power supply line LH to the DC power supply line LL via the switch Sl to accumulate energy in the reactor L4. Subsequently, the switch Sl is turned off, so that the energy is accumulated in the capacitor C4 via the diode D40.

Since the voltage Vc across the capacitor C4 is higher than the rectified voltage Vrec, no current basically flows through the diode D42. Thus, whether or not the switch Sc is conducting depends solely on whether or not the transistor Sc is conducting. Here, the diode D42 ensures a reverse breakdown voltage when the voltage Vc across the capacitor C4 is lower than the rectified voltage Vrec, and functions to cause a current flowing back from an inductive load 6 to the DC link 7 to perform reverse conduction when the inverter 5 abnormally stops.

Furthermore, since the DC power supply line LH is higher in potential than the DC power supply line LL, no current basically flows through the diode D41. Thus, whether or not the switch Sl is conducting depends solely on whether or not the transistor Sl is conducting. Here, the diode D41 is exemplified as a diode for bringing a reverse breakdown voltage and reverse conduction and as a diode built in the transistor Sl which is an IGBT, but the diode D41 does not play a part in a circuit operation.

The current blocking circuit 4c is provided on the DC power supply line LH between the charge circuit 4b and the discharge circuit 4a. For example, a diode D43 serves as the current blocking circuit 4c. The anode of the diode D43 is connected to the reactor L4 on the opposite side of the switch Sl (i.e., on the converter 3 side). The cathode of the diode D43 is connected to the switch Sc on the opposite side of the capacitor C4 (i.e., on the inverter 5 side). The current blocking circuit 4c is known from, for example, Japanese Patent No. 5772915.

The inverter 5 converters a DC voltage between the DC power supply lines LH and LL into an AC voltage and outputs the AC voltage to output terminals Pu, Pv, and Pw. The inverter 5 includes six switching elements Sup, Svp, Swp, Sun, Svn, and Swn. The switching elements Sup, Svp, and Swp are connected between the output terminals Pu, Pv, and Pw, respectively, and the DC power supply line LH. The switching elements Sun, Svn, and Swn are connected between the output terminals Pu, Pv, and Pw, respectively, and the DC power supply line LL. The inverter 5 is a so-called voltage source inverter and includes six diodes Dup, Dvp, Dwp, Dun, Dvn, and Dwn.

Each of the diodes Dup, Dvp, Dwp, Dun, Dvn, and Dwn is arranged such that the cathode thereof is directed toward the DC power supply line LH and the anode thereof is directed toward the DC power supply line LL. The diode Dup is connected in parallel to the switching element Sup between the output terminal Pu and the DC power supply line LH. Likewise, the diodes Dvp, Dwp, Dun, Dvn, and Dwn are connected in parallel to the switching elements Svp, Swp, Sun, Svn, and Swn, respectively. The output terminals Pu, Pv, and Pw output load currents iu, iv, and iw, respectively. These load currents constitute a three-phase AC current. For example, IGBTs are adopted as the switching elements Sup, Svp, Swp, Sun, Svn, and Swn.

The inductive load 6 is, for example, a rotary machine, and is illustrated as an equivalent circuit representing an inductive load. Specifically, a reactor Lu and a resistor Ru are connected in series to each other, and one end of this series structure is connected to the output terminal Pu. Similar series structures are obtained for reactors Lv and Lw and resistors Rv and Rw. The other ends of these series structures are connected to each other.

When a control system is exemplified in which the inductive load 6 serves as a synchronous machine, a velocity detector 9 detects the load currents iu, iv, and iw flowing through the inductive load 6 and provides a control device 10 for the direct power converter with a rotational angular velocity $\omega m$, a q-axis current Iq, and a d-axis current Id (to be precise, information representing them; the same applies hereinafter) that are obtained from the load currents iu, iv, and iw.

The control device 10 receives an amplitude Vm of the single-phase AC voltage Vin, an angular velocity $\omega$ (or a phase $\theta=\omega t$, which is the product of the angular velocity $\omega$ and a time t), a command value $\omega m^*$ of the rotational angular velocity, a command value $Vq^*$ of a q-axis voltage (hereinafter also referred to as a "q-axis voltage command value"), a command value $Vd^*$ of a d-axis voltage (hereinafter also referred to as a "d-axis voltage command value"), and currents Ish and il, as well as the rotational angular velocity $\omega m$, the q-axis current Iq, and the d-axis current Id.

Here, the current Ish is an instantaneous value of a current flowing through the inverter 5 and is measured in either the DC power supply line LL or LH by using a known technique. The current il is a reactor current flowing through the reactor L4 and corresponds to the above-described buffer current. The reactor current il is measured by, for example, a known current protecting device. The configuration for obtaining the currents Ish and il is a known technique and thus the illustration thereof is omitted here.

Figure 2:
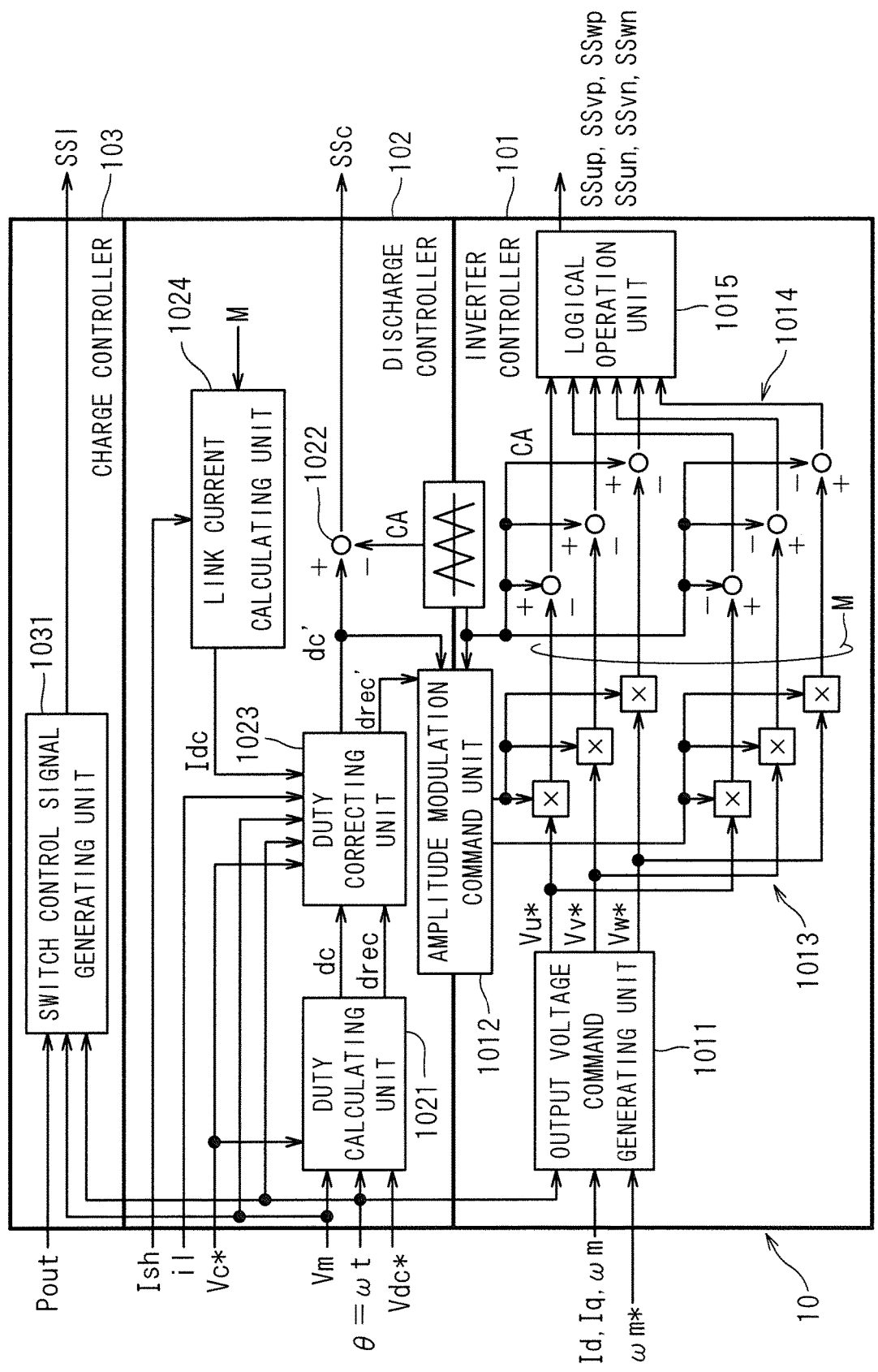
FIG. 2 is a block diagram exemplifying the configuration of a control device.

FIG. 2 is a block diagram exemplifying the configuration of the control device 10. The control device 10 includes an inverter controller 101, a discharge controller 102, and a charge controller 103.

The inverter controller 101 outputs inverter control signals SSup, SSvp, SSwp, SSun, SSvn, and SSwn on the basis of a discharge duty dc', a rectification duty drec', and command values of voltages (hereinafter also referred to as "voltage command values") $Vu^*$, $Vv^*$, and $Vw^*$ output from the inverter 5, which will be described below. The inverter control signals SSup, SSvp, SSwp, SSun, SSvn, and SSwn control the operations of the switching elements Sup, Svp, Swp, Sun, Svn, and Swn, respectively.

The inverter controller 101 includes an output voltage command generating unit 1011 that generates the voltage command values $Vu^*$, $Vv^*$, and $Vw^*$ on the basis of the phase $\theta$ ($=\omega t$), the q-axis current Iq, the d-axis current Id, the rotational angular velocity $\omega m$, and its command value $\omega m^*$.

The inverter controller 101 further includes an amplitude modulation command unit 1012, a multiply-accumulate operation unit 1013, a comparing unit 1014, and a logical operation unit 1015.

The amplitude modulation command unit 1012 controls an operation of the multiply-accumulate operation unit 1013 on the basis of the discharge duty dc' and the rectification duty drec'. The multiply-accumulate operation unit 1013 (only the signs of multipliers are illustrated for the sake of simplicity) performs multiply-accumulate operation between the voltage command values $Vu^*$, $Vv^*$, and $Vw^*$, and the discharge duty dc' and the rectification duty drec', thereby generating signal waves M.

The comparing unit 1014 outputs results of comparison in value between the signal waves M and a carrier CA to the logical operation unit 1015. The logical operation unit 1015 performs logical operation on the results of comparison and outputs the inverter control signals SSup, SSvp, SSwp, SSun, SSvn, and SSwn.

The discharge controller 102 includes a duty calculating unit 1021, a comparator 1022, and a duty correcting unit 1023.

The duty calculating unit 1021 receives the phase $\theta$, the amplitude Vm, a command value $Vc^*$ of the voltage Vc across the capacitor C4, and a command value $Vdc^*$ of a DC voltage Vdc described below, and calculates an original discharge duty dc and an original rectification duty drec.

The duty correcting unit 1023 corrects the original discharge duty dc and the original rectification duty drec to obtain the discharge duty dc' and the rectification duty drec'.

Accordingly, the duty calculating unit 1021 and the duty correcting unit 1023 can collectively be regarded as a duty generating unit that generates the discharge duty dc' and the rectification duty drec'.

The generation of the original discharge duty dc, the original rectification duty drec, the discharge duty dc', and the rectification duty drec' will be described below.

The comparator 1022 compares the discharge duty dc' with the carrier CA to generate a discharge switch signal SSc for bringing the switch Sc into conduction.

The operations of the inverter controller 101 and the comparator 1022 are known techniques (see, for example, Japanese Patent No. 5804167 and Japanese Patent No. 5874800), and thus the details thereof is omitted here.

The charge controller 103 includes a switch control signal generating unit 1031 that generates a control signal SSl for controlling ON and OFF of the switch Sl. The switch control signal generating unit 1031 is known from Suga, Kimata, Uchida, "A Simple Switching Method for A Improved Power Factor Type Single Phase Converter", The transactions of the Institute of Electrical Engineers of Japan D, Vol. 116, No. 4, pp. 420-426, 1996 and Uesgi and four others, "Single-Phase Twice voltage PFC Converter for air conditioner", The transactions of the Institute of Electrical Engineers of Japan D, Vol. 119, No. 5, pp. 592-598, 1999, and thus the details thereof is omitted here but will be briefly described below. For example, the switch control signal generating unit 1031 generates the control signal SSl on the basis of an output power Pout, which is instantaneous power output from the inverter 5, and the amplitude Vm.

B. Outline of Operation of Power Buffer Circuit 4

A converter input power Pin, which is instantaneous power input to the converter 3, is expressed by the following Equation (1), with an amplitude Im of the input current Iin being introduced and an input power factor being 1.

[Math. 1]

$$Pin = Vm \cdot \text{Im} \cdot \sin^2(\omega t) \qquad (1)$$
$$= \frac{Vm \cdot \text{Im}}{2} - \frac{Vm \cdot \text{Im}}{2} \cdot \cos(2\omega t)$$

The converter input power Pin has an AC component $(-1/2) \cdot Vm \cdot \text{Im} \cdot \cos(2\omega t)$ represented by the second term of the rightmost side of Equation (1) (hereinafter also referred to as an "AC component Pin^"). Thus, hereinafter the converter input power Pin may also be referred to as a ripple power Pin.

The power converter illustrated in FIG. 1 can be grasped as follows.

The converter 3 receives the single-phase AC voltage Vin and outputs the ripple power Pin. The power buffer circuit 4 receives an instantaneous power Pl (hereinafter also referred to as a "receiving power Pl") from the DC link 7 and outputs an instantaneous power Pc (hereinafter also referred to as a "supply power Pc") to the DC link 7. The inverter 5 receives, from the DC link 7, an inverter input power Pdc (=Pin+Pc−Pl), which is an instantaneous power obtained by subtracting the receiving power Pl from the sum of the ripple power Pin and the supply power Pc, and outputs the load currents iu, iv, and iw. When the loss of the inverter 5 is disregarded, the inverter input power Pdc is equal to the output power Pout.

FIG. 3 is a block diagram schematically illustrating the input and output of power to and from the direct power converter illustrated in FIG. 1. An instantaneous power Pbuf subjected to buffering (hereinafter also referred to as a "buffering power Pbuf") is equal to a power difference (Pc−Pl) obtained by subtracting the receiving power Pl from the supply power Pc. An instantaneous power Prec transmitted from the converter 3 toward the inverter 5 is equal to a power difference (Pin−Pl). Thus, Pdc=Prec+Pc holds.

When the power buffer circuit 4 supplies and receives the power corresponding to an absolute value |Pin^| of the AC component Pin' to and from the DC link 7, Pdc=Pin−Pin^, and the following Equation (2) holds.

[Math. 2]

$$Pdc = \frac{Vm \cdot \text{Im}}{2} \qquad (2)$$

C. Equivalent Circuit of Direct Power Converter and Various Duties

FIG. 4 illustrates an equivalent circuit of the direct power converter illustrated in FIG. 1. The equivalent circuit is introduced in, for example, Japanese Patent No. 5804167 and Japanese Patent No. 5874800. In the equivalent circuit, a current irec1 is equivalently represented as a current irec1 that flows via a switch Srec when the switch Srec is conducting. Likewise, a discharge current ic is equivalently represented as a current ic that flows via the switch Sc when the switch Sc is conducting.

In addition, a current flowing into the inductive load 6 via the inverter 5 when the output terminals Pu, Pv, and Pw are connected in common to either the DC power supply line LH or LL in the inverter 5 is equivalently represented as a zero-phase current iz that flows via a switch Sz when the switch Sz is conducting.

FIG. 4 illustrates the reactor L4, the diode D40, and the switch Sl that constitute the charge circuit 4b, and also illustrates the reactor current il flowing through the reactor L4.

In this equivalent circuit, duties drec', dc', and dz' at which the switches Srec, Sc, and Sz are brought into conduction, respectively, are introduced. Note that, as is known from the above-mentioned documents, $0 \le drec' \le 1$, $0 \le dc' \le 1$, $0 \le dz' \le 1$, and drec'+dc'+dz'=1.

The duty drec' is a duty for setting a time period over which the converter 3 is connected to the DC link 7 and a current is allowed to flow through the inverter 5, and is thus the rectification duty drec' described above.

The duty dc' is a duty at which the capacitor C4 discharges, and is thus the discharge duty dc' described above.

The duty dz' is a duty at which the zero-phase current iz always flows regardless of an output voltage in the inverter 5, and thus may be referred to as a zero duty dz'.

A DC current Idc is a current flowing into the inductive load 6 via the inverter 5 and can be calculated from the current Ish in a manner described below. The currents irec1, ic, and iz are obtained by multiplying the duties drec', dc', and dz', respectively, by the DC current Idc. Thus, the currents irec1, ic, and iz are average values in the switching periods of the switches Srec, Sc, and Sz, respectively. The duties drec', dc', and dz' can also be regarded as current distribution factors of the DC current Idc to the currents irec1, ic, and iz, respectively.

In the case of adopting a diode bridge as the converter 3, the converter 3 is unable to actively perform switching at the rectification duty drec'. Thus, the inverter 5 and the switch Sc perform switching in accordance with the zero duty dz' and the discharge duty dc', respectively, thereby being able to obtain the current irec1.

In a time period over which the zero-phase current iz flows, the inverter 5 is unable to use a DC voltage in the DC link 7. Thus, the DC voltage in the DC link 7, used for supplying power to the inverter 5 holds significance in power conversion. In other words, an instantaneous DC voltage that is not used by the inverter 5 for power conversion does not hold significance. With the DC voltage Vdc holding significance in power conversion being introduced and Equation (2) being considered, the DC current Idc can be expressed by the following Equation (3). The DC voltage Vdc can be expressed by the following Equation (4).

[Math. 3]

$$Idc = \frac{Pdc}{Vdc} = \frac{Vm \cdot Im}{2 \cdot Vdc} \quad (3)$$

[Math. 4]

$$Vdc = Vrec \cdot drec' + Vc* \cdot dc' + 0 \cdot dz' \quad (4)$$

On the other hand, the DC voltage Vdc can also be grasped as a voltage to be applied to the DC link 7 as an average value of maximum values of the voltage that the inverter 5 can output in the period of controlling switching of the switches Sc and Sl and the inverter 5. This is because the inverter 5 is insulated from either the DC power supply line LL or LH during a time period corresponding to the zero duty dz' although the inverter 5 may contribute to the voltage of the DC link 7 at a ratio represented by the zero duty dz'.

In FIG. 4, the DC voltage Vdc is illustrated as a voltage that is generated across a current source Idc (that supplies the DC current Idc) representing the inverter 5 and the inductive load 6.

In the present invention, equations using the amplitude Im of the input current are used, but it is not always necessary to measure the amplitude Im. For example, the inverter input power Pdc can be calculated in the manner described below.

As an example, a description will be given of the case of performing well-known control of dq axes regarding an operation of a normal AC load. A power equation on the dq axes is typically expressed by Equation (5). Symbols V* and I represent a command value of a voltage applied to the AC load and a current flowing through the AC load, respectively. These are AC, and thus a dot representing a complex number is attached on each of the symbols V* and I. Note that the q-axis voltage ideally follows its command value, that is, the q-axis voltage command value Vq*, and the d-axis voltage ideally follows its command value, that is, the d-axis voltage command value Vd*.

[Math. 5]

$$P + jQ = \dot{V}^* \cdot \dot{I} = Vd^* \cdot Id + Vq^* \cdot Iq + j(Vq^* \cdot Id - Vd^* \cdot Iq) \quad (5)$$

There is no reactive power in the inverter input power Pdc supplied from the DC power supply lines LH and LL to the inverter 5, and thus the inverter input power Pdc is expressed by Equation (6), with the second term of the rightmost side of Equation (5) being disregarded.

[Math. 6]

$$Pdc = Vd^* \cdot Id + Vq^* \cdot Iq \quad (6)$$

Figure 5:
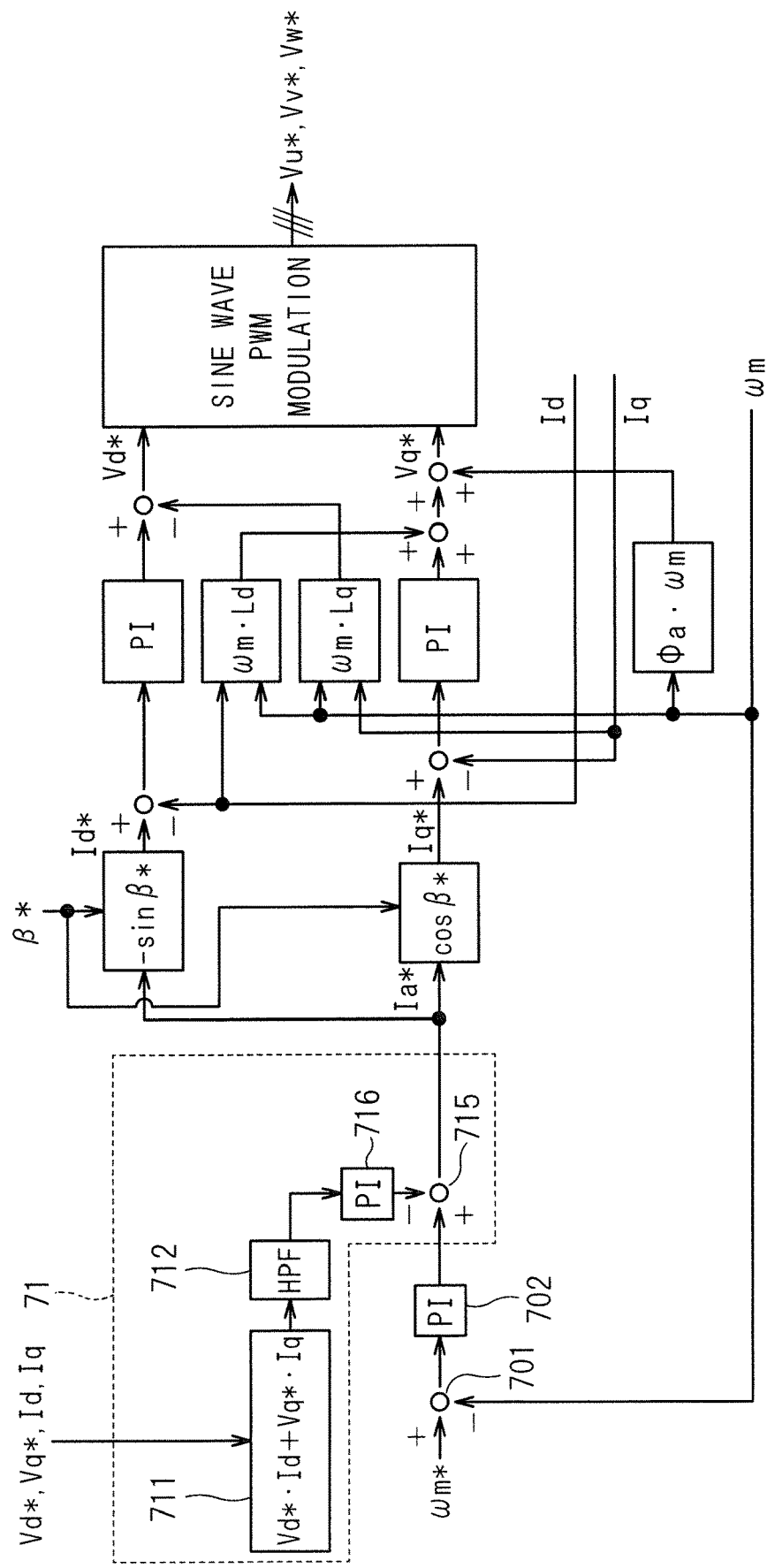
FIG. 5 is a block diagram illustrating an example of a configuration for performing control to make ripple of output power zero.

Thus, control of making a ripple (AC component) zero of Equation (6) enables control of realizing Equations (3) and (4) to be performed. An example of a configuration for performing the foregoing control is illustrated in FIG. 5 as a block diagram. This configuration is provided in, for example, a configuration illustrated as the output voltage command generating unit 1011 in FIG. 2.

A brief description will be given of the part corresponding to a known technique in the configuration in FIG. 5. Trigonometric function values cos β* and −sin β* are calculated from a current phase command value β*, and a q-axis current command value Iq* and a d-axis current command value Id* are generated from the trigonometric function values cos β* and −sin β* and a current command value Ia*. Assuming that the inductive load 6 is a rotary machine, the q-axis voltage command value Vq* and the d-axis voltage command value Vd* are calculated on the basis of the rotational angular velocity ωm of the rotary machine, a field magnetic flux φa of the rotary machine, a d-axis inductance Iq* and a q-axis inductance Lq of the rotary machine, the q-axis current command value Iq*, the d-axis current command value Id*, the q-axis current Iq, and the d-axis current Id. On the basis of the q-axis voltage command value Vq* and the d-axis voltage command value Vd*, the voltage command values Vu*, Vv*, and Vw* for controlling the inverter 5 are generated.

For example, in the configuration illustrated in FIG. 1, the velocity detector 9 detects the load currents iu, iv, and iw flowing through the inductive load 6 and supplies the control device 10 with the rotational angular velocity ωm obtained from the load currents, the q-axis current Iq, and the d-axis current Id.

A DC power calculating unit 711 receives the q-axis voltage command value Vq*, the d-axis voltage command value Vd*, the q-axis current Iq, and the d-axis current Id, calculates the inverter input power Pdc on the basis of Equation (6) given above, and supplies a calculation result to a ripple extracting unit 712.

The ripple extracting unit 712 extracts and outputs an AC component of Equation (6). For example, a high-pass filter HPF serves as the ripple extracting unit 712. A PI processing unit 716 performs proportional-integral control on the AC component, and a value obtained thereby is output to a subtracter 715.

The subtracter 715 performs a process of correcting the current command value Ia* in a normal process by using the output of the PI processing unit 716. Specifically, as a normal process for calculating the current command value Ia*, a subtracter 701 calculates a deviation between the rotational angular velocity ωm and the command value ωm* thereof. The deviation is subjected to proportional-integral control by a PI processing unit 702, and the current command value Ia* is once calculated. Subsequently, the subtracter 715 performs a process of decreasing the current command value Ia* with the output from the PI processing unit 716.

The above-described known technique is applied to the current command value Ia* corrected in this manner by a processing unit 71, so that the q-axis voltage command value Vq* and the d-axis voltage command value Vd* are generated. With this control, control is performed by giving feedback on the q-axis voltage command value Vq* and the d-axis voltage command value Vd*, and the q-axis current Iq and the d-axis current Id, so that the AC component of the inverter input power Pdc converges to zero.

D. Principle of Present Embodiment

As described in Japanese Patent No. 5804167 and Japanese Patent No. 5874800 and so forth, the rectification duty drec' and the discharge duty dc' are determined without particularly drawing a distinction between a reception period and a supply period in the present embodiment. First, the original rectification duty drec and the original discharge duty dc are once defined by Equations (7) and (8), respectively. Note that the command value Vdc* of the DC voltage Vdc can be used as the DC voltage Vdc. That is, the DC voltage Vdc will be hereinafter handled as a predetermined voltage.

[Math. 7]

$$drec = \frac{Vdc}{Vm} \cdot |\sin(\omega t)| \quad (7)$$

[Math. 8]

$$dc = \frac{Vdc}{Vc*} \cdot \cos^2(\omega t) \quad (8)$$
$$= \frac{Vdc}{2 \cdot Vc*} \cdot [1 + \cos(2\omega t)]$$

As long as Vdc≤Vm, 0≤drec≤1 is satisfied. In addition, a setting satisfying 0≤dc≤1 is possible when the DC voltage Vdc is set to be smaller than or equal to the command value Vc*.

Equation (9) is obtained from Equations (7) and (8). Equation (9) matches a case where drec'=drec, dc'=dc, and dz'=dz in Equation (4). Thus, Equations (4) and (9) express the validity of control using the original rectification duty drec and the original discharge duty dc.

[Math. 9]

$$Vrec \cdot drec + Vc* \cdot dc + 0 \cdot dz = Vm \cdot |\sin(\omega t)| \cdot \frac{Vdc}{Vm} \cdot |\sin(\omega t)| + \quad (9)$$
$$Vdc \cdot \cos^2(\omega t)$$
$$= Vdc$$

On the basis of Equations (3) and (7), the current irec1 in the case of performing control using the original rectification duty drec is calculated by using the following Equation (10).

[Math. 10]

$$irec1 = drec \cdot Idc \quad (10)$$
$$= \frac{Vdc}{Vm} \cdot |\sin(\omega t)| \cdot \frac{Vm \cdot Im}{2 \cdot Vdc}$$
$$= \frac{Im}{2} \cdot |\sin(\omega t)|$$

As described in Japanese Patent No. 5804167 and Japanese Patent No. 5874800, when the reactor current il has a value il0=irec1 expressed by the following Equation (11), the input current Iin becomes sinusoidal with use of the original rectification duty drec and the original discharge duty dc.

[Math. 11]

$$il = il0 = Im \cdot |\sin(\omega t)| - irec1 \quad (11)$$
$$= \frac{Im}{2} \cdot |\sin(\omega t)|$$
$$= irec1$$

FIG. 6 includes graphs showing an operation of the direct power converter illustrated in FIG. 1, and illustrates an operation under control using the original rectification duty drec and the original discharge duty dc (dz=1−dc−drec).

In FIG. 6, the top graph shows the duties drec, dc, and dz; the second graph from the top shows the DC voltage Vdc, the voltages drec·Vrec and dc·Vc (see Equation (4)) that constitute the DC voltage Vdc, and the DC current Idc; the third graph from the top shows the currents irec, ic, il, and irec1; and the bottom graph shows the instantaneous powers Pin, Pdc, Pbuf, Pc, −Pl, and Prec. It is assumed that the voltage Vc across the capacitor C4 accurately follows the command value Vc*.

In FIG. 6, the horizontal axis represents the phase ωt, with "degrees" being used as the unit. The currents Idc, irec, ic, il, and irec1 are converted by using an amplitude Im of √2. The voltages Vrec·drec and Vc·dc are converted by using an amplitude Vm of 1, and Vc=1.14 Vm. Vdc=0.86 Vm, so that the minimum value of dz=1−dc−drec is 0. The instantaneous powers Pin, Pout, Pbuf, Pc, −Pl, and Prec are calculated as the products of the voltages converted in the above-described manner and currents.

FIG. 6 exemplifies a case where the reactor current il has a value il0, where the waveform of the current irec exhibits an absolute value of a sine wave.

However, if the reactor current il that does not have a waveform of the absolute value of a sine wave is allowed to flow in the control using the original rectification duty drec, the input current Iin may be distorted from a sinusoidal waveform. Thus, the direct power converter is controlled by using the rectification duty drec' obtained by correcting the original rectification duty drec as described below.

The current irec1 is decreased in response to a requirement of cancelling out an influence on the input current Iin when the reactor current il is larger than the value il0. Thus, the rectification duty drec' is decreased to be smaller than the original rectification duty drec. Thus, the relationship of the following Equation (12) is established in view of the continuity of current. When il=il0, drec'=drec.

[Math. 12]

$$(drec' - drec) \cdot Idc + (il - il0) = 0 \therefore drec' = drec - (il - il0)/Idc \quad (12)$$

Deformation of Equation (12) produces the following Equation (13). The second term in the square brackets (the symbol "[" and the symbol "]") of the rightmost side is a correction term for the original rectification duty drec. The correction term is a value obtained by subtracting a ratio (il/Idc) from the original rectification duty drec.

[Math. 13]

$$drec' = \frac{irec1}{Idc} - \frac{il - irec1}{Idc} \quad (13)$$
$$= drec + \left[drec - \left(\frac{il}{Idc}\right)\right]$$

The adoption of the rectification duty drec' decreases distortion of the input current Iin from a sinusoidal waveform regardless of the waveform of the reactor current il.

When the reactor current il that does not have a waveform of the absolute value of a sine wave is allowed to flow in the control using the original discharge duty dc, the waveform of the buffering power Pbuf becomes distorted and the output power Pout (=Pdc) has ripple, although the function of the power buffer is maintained. Thus, the direct power converter is controlled by using the discharge duty dc' obtained by correcting the original discharge duty dc as will be described below.

The discharge current ic is increased in response to a requirement of cancelling out an influence on the voltage Vc across the capacitor C4 when the reactor current il is larger than the value il0. Thus, the discharge duty dc' is increased to be larger than the original discharge duty dc. Thus, the relationship of the following Equation (14) is established in view of the power for charging the capacitor C4. When il=il0, dc'=dc.

[Math. 14]

$$Vc^* \cdot Idc \cdot (dc' - dc) = (il - il0) \cdot Vm \cdot |\sin(\omega t)| \quad (14)$$

Regarding a part of the right side of Equation (14), the following Equation (15) is obtained.

[Math. 15]

$$Vm \cdot \frac{-il0 \cdot |\sin(\omega t)|}{Vc* \cdot Idc} = Vm \cdot \frac{-drec \cdot |\sin(\omega t)|}{Vc*} \quad (15)$$
$$= -\frac{Vdc \cdot |\sin(\omega t)| \cdot |\sin(\omega t)|}{Vc*}$$
$$= -\frac{Vdc}{2Vc*} \cdot [1 - \cos(2\omega t)]$$

Accordingly, the following Equation (16) is obtained from Equations (14) and (15).

[Math. 16]

$$dc' = \frac{Vdc}{Vc*} \cdot \cos(2\omega t) + \left(\frac{il}{Idc}\right) \cdot \frac{Vm}{Vc*} \cdot |\sin(\omega t)| \quad (16)$$

Regarding the first term of the right side of Equation (16), the following equation (17) is obtained.

[Math. 17]

$$\frac{Vdc}{Vc*} \cdot \cos(2\omega t) = \frac{Vdc}{2Vc*} \cdot [2 + 2 \cdot \cos(2\omega t) - 2] \quad (17)$$
$$= 2 \cdot dc - \frac{Vdc}{Vc*}$$

The following Equation (18) is obtained from Equations (16) and (17). The second term in the square brackets (the symbol "[" and the symbol "]") of the right side is a correction term for the original discharge duty dc. The correction term is a value obtained by adding a first value to the original discharge duty dc. The first value is a value obtained by dividing a second value by the command value Vc*. The second value is a value obtained by subtracting the DC voltage Vdc from the product of the ratio (il/Idc) and the rectified voltage Vrec.

[Math. 18]

$$dc' = dc + \left[ dc + \frac{\left(\frac{il}{Idc}\right) \cdot Vm \cdot |\sin(\omega t)| - Vdc}{Vc*} \right] \quad (18)$$

The adoption of the discharge duty dc' smooths the output power Pout and removes a ripple component therefrom regardless of the waveform of the reactor current il.

The output power Pout is equal to the product Vdc·Idc, which is equal to the inverter input power Pdc. Accordingly, the following Equation (19) holds with reference to Equations (2), (9), and (11).

[Math. 19]

$$Vrec \cdot drec' + Vc* \cdot dc' = Vrec \cdot [drec - (il - il0)/Idc] + \quad (19)$$
$$\quad Vdc \cdot \cos(2\omega t) + (il/Idc) \cdot$$
$$\quad Vm \cdot |\sin(\omega t)|$$
$$= Vrec \cdot drec - Vrec \cdot (il/Idc) +$$
$$\quad Vrec \cdot (il0/Idc) +$$
$$\quad Vdc \cdot \cos(2\omega t) + (il/Idc) \cdot Vrec$$
$$= Vrec \cdot drec + Vdc[\cos^2(\omega t) -$$
$$\quad \sin^2(\omega t)] +$$
$$\quad \frac{Vm \cdot |\sin(\omega t)| \cdot (Im/2) \cdot |\sin(\omega t)|}{Idc}$$
$$= Vrec \cdot drec + Vdc \cdot \cos^2(\omega t)$$
$$= Vdc$$

This equation matches Equation (4). It is understood that the adoption of the rectification duty drec' and the discharge duty dc' enables control to make the DC voltage Vdc constant.

The corrections expressed by Equations (13) and (18) are realized by the duty correcting unit 1023. The corrections require the DC voltage Vdc, which is calculated from the original rectification duty drec and the original discharge duty dc, the amplitude Vm and the phase θ, and the command value Vc*, as expressed by Equation (9). Alternatively, the command value Vdc* may be used.

Thus, it can be considered that the corrections expressed by Equations (13) and (18) are performed on the basis of the ratio (il/Idc). Furthermore, the amplitude Im of the input current is unnecessary not only for generating the original rectification duty drec and the original discharge duty dc but also for performing correction to obtain the rectification duty drec' and the discharge duty dc'.

E. Obtainment of DC Current Idc

As described above, the DC current Idc can be calculated from a measurement value of the current Ish. For preparation for the description thereof, the following quantities are introduced. A period T0 is one period of a carrier CA. Time periods τ4 and τ6 respectively represent the lengths of time periods over which a first state and a second state are realized in the period T0.

The first state and the second state will be described while focusing attention on a period in which the switching element Swp is continuously in an OFF state and the switching element Swn is continuously in an ON state in the inverter 5 in one period of the carrier CA. The first state is a state in which the switching elements Sup and Svn are in an ON state and the switching elements Sun and Svp are in an OFF state. The second state is a state in which the switching elements Sup and Svp are in an ON state and the switching elements Sun and Svn are in an OFF state. It is known that Equation (20) holds when the phase θv of the voltage output from the inverter 5 and a coefficient of 0<k<1 are introduced (see, for example, Japanese Patent Application Laid-Open No. 2016-103961).

[Math. 20]

$$\tau 0/T0 = 1 - k \cdot \sin(\theta v + \pi/3)$$

$$\tau 4/T0 = k \cdot \sin(\pi/3 - \theta v)$$

$$\tau 6/T0 = k \cdot \sin(\theta v) \tag{20}$$

Likewise, the phase θi and amplitude Io of the load current iu are introduced, the load currents iu, iv, and iw forming three-phase AC, and Equation (21) holds.

[Math. 21]

$$iu = Io \cdot \cos(\theta i)$$

$$iv = Io \cdot \cos(\theta i - 2\pi/3)$$

$$iw = Io \cdot \cos(\theta i + 2\pi/3) \tag{21}$$

The current Ia in Equation (22) is used as the DC current Idc. The period T0 is one period of the carrier CA. The time periods τ4 and τ6 respectively represent the lengths of time periods over which the first state and the second state are realized in the period T0. Currents Ish(t4) and Ish(t6) respectively represent the values of the current Ish measured at time t4 and time t6. Time t4 and time t6 are respectively selected from the time points at which the first state and the second state are realized.

[Math. 22]

$$Ia = \frac{\tau 4 \cdot Ish(t4) + \tau 6 \cdot Ish(t6)}{To} \tag{22}$$

Thus, in the first state, the load current iu flows from the output terminal Pu to the inductive load 6 and flows from the output terminals Pv and Pw to the DC power supply line LL. In the second state, the load currents iu and iv flow from the output terminals Pu and Pv, respectively, to the inductive load 6, and flow from the output terminal Pw to the DC power supply line LL. On the basis of the relationship iu+iv+iw=0, Equation (23) is obtained.

[Math. 23]

$$Ish(t4) = iu, Ish(t6) = -iw \tag{23}$$

Equation (22) is deformed into the following Equation (24) by using Equations (20), (21), and (23). Here, ψ=θv−θi is the phase difference between the voltage and current output from the inverter 5, and thus cos ψ represents the power factor of the inverter 5.

[Math. 24]

$$\begin{aligned}
Ia &= k \cdot Io \cdot [\sin(\pi/3 - \theta v) \cdot \cos(\theta o) - \sin(\theta v) \cdot \cos(\theta i + 2\pi/3)] \\
&= \frac{k \cdot Io}{2}[\{\sin(\pi/3) \cdot \cos(\theta v - \theta i) - \cos(\pi/3) \cdot \sin(\theta v - \theta i) + \\
&\quad \sin(\pi/3) \cdot \cos(\theta v + \theta i) - \cos(\pi/3) \cdot \sin(\theta v + \theta i)\} - \\
&\quad \{\sin(2\pi/3) \cdot \cos(\theta v + \theta i) + \cos(2\pi/3) \cdot \sin(\theta v + \theta i) + \\
&\quad \sin(-2\pi/3) \cdot \cos(\theta v - \theta i) + \\
&\quad \cos(-2\pi/3) \cdot \sin(\theta v - \theta i)\}] \\
&= \frac{k \cdot Io}{2}[\cos(\theta v - \theta i)\{\sin(\pi/3) - \sin(-2\pi/3)\} + \\
&\quad \cos(\theta v + \theta i)\{\sin(\pi/3) - \sin(2\pi/3)\} + \\
&\quad \sin(\theta v - \theta i)\{-\cos(\pi/3) - \cos(-2\pi/3)\} + \\
&\quad \sin(\theta v + \theta i)\{-\cos(\pi/3) - \cos(2\pi/3)\}] \\
&= \frac{\sqrt{3} \cdot k \cdot Io}{2}\cos(\theta v - \theta i) = \frac{\sqrt{3} \cdot k \cdot Io}{2}\cos\psi
\end{aligned} \tag{24}$$

On the other hand, Equation (25) holds when the power factor cos ψ is used. A voltage Vr and a current il are effective values of the voltage and current, respectively, output from the inverter 5.

[Math. 25]

$$\sqrt{3} \cdot Vr \cdot ir \cdot \cos \psi = Vdc \cdot Idc \tag{25}$$

(where $Vr = k \cdot Vdc/\sqrt{2}, ir = Io/\sqrt{2}$)

The following Equation (26) is obtained from Equation (25).

[Math. 26]

$$\begin{aligned}
Idc &= (\sqrt{3} \cdot k \cdot Vdc/\sqrt{2}) \cdot (Io/\sqrt{2}) \cdot \cos\psi \\
&= \frac{\sqrt{3} \cdot k \cdot Io}{2} \cdot \cos\psi
\end{aligned} \tag{26}$$

From the comparison between Equations (24) and (26), it is understood that the current Ia can be adopted as the DC current Idc.

The calculation based on Equation (22) is executed by a link current calculating unit 1024 included in the discharge controller 102. Since the period T0 is a preset value and the time periods τ4 and τ6 can be obtained from the signal waves M, the current Ish and the signal waves M are input to the link current calculating unit 1024, and the DC current Idc is calculated.

F. Example of Reactor Current il

In the above-described manner, buffering of power can be performed while making the input current Iin sinusoidal, even if the waveform of the reactor current il does not exhibit the absolute value of a sine wave. Thus, hereinafter a description will be given of an operation according to the present embodiment by using as an example the reactor current il when simple switching is adopted. Flow of the reactor current il caused by simple switching reduces noise generated by the switch Sl, and the reduction of distortion of the input current Iin from a sinusoidal waveform can reduce power supply harmonics.

Figure 7:
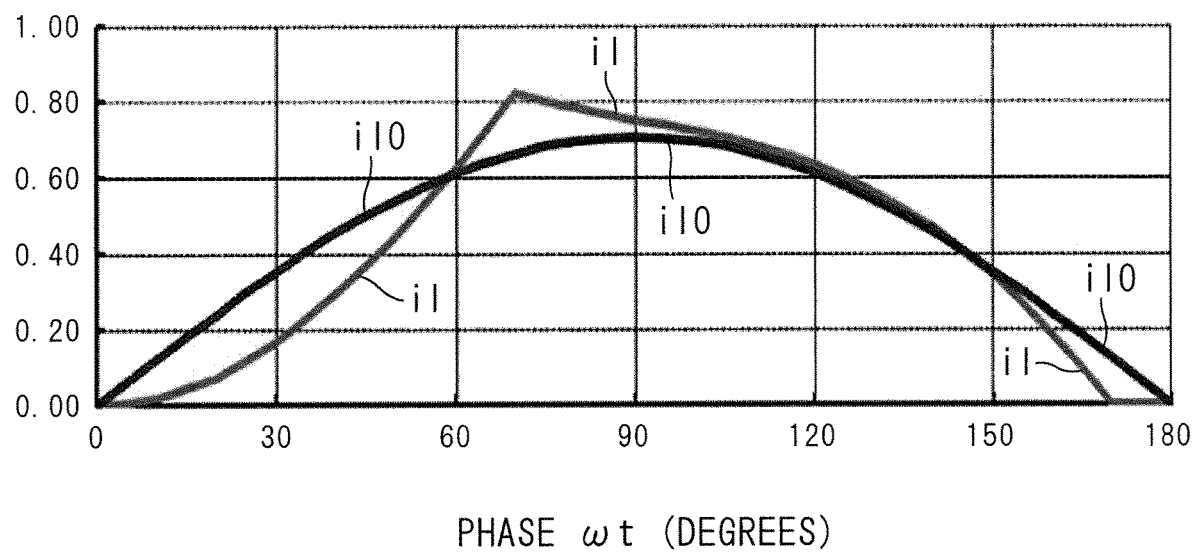
FIG. 7 is a graph showing the waveform of a buffer current when simple switching is adopted.

FIG. 7 is a graph showing the waveform of the reactor current il when simple switching is adopted. Here, a region where the phase ωt is 0 to 180 degrees is shown. The waveform of the value il0 is also shown for reference.

In simple switching, the switch Sl is brought into conduction at a phase of 0 degrees, the switch Sl is brought out of conduction at the phase $\omega t=\phi(0<\phi<180)$ (degrees), and the non-conduction state of the switch Sl is maintained until the phase reaches 180 degrees. That is, in simple switching, the switch Sl is turned on once and turned off once during one period of the rectified voltage Vrec (this is equal to a half-period of the single-phase AC voltage Vin).

Figure 10:
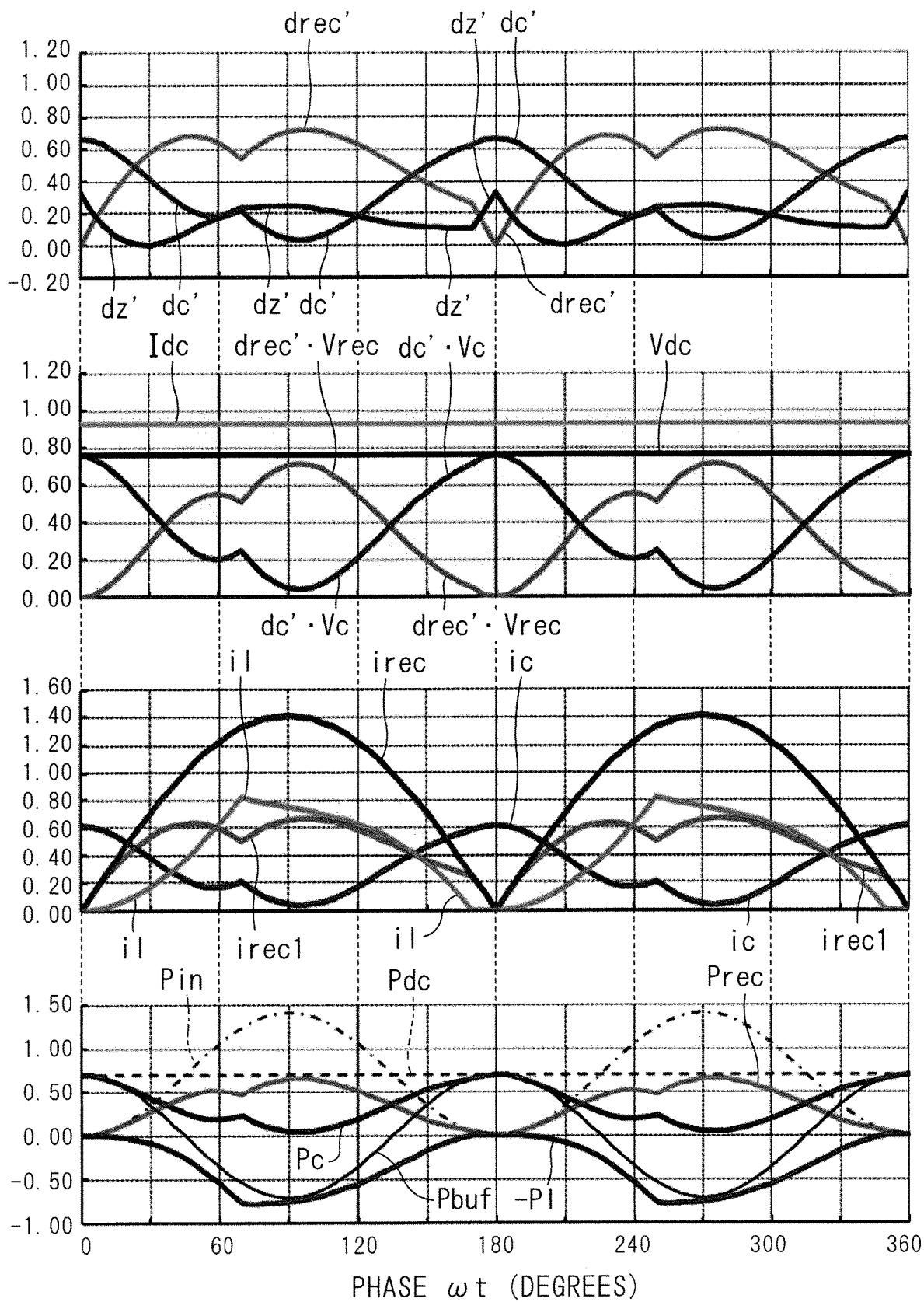
FIG. 10 includes graphs showing an operation of the direct power converter.

The phase $\phi$ is set in the following manner, for example. In Uesgi and four others, "Single-Phase Twice voltage PFC Converter for air conditioner", The transactions of the Institute of Electrical Engineers of Japan D, Vol. 119, No. 5, pp. 592-598, 1999, FIG. 10 illustrates the relationship among a value Ts corresponding to the time period over which the switch Sl is conducting, the voltage Vc across the capacitor, a power factor, and output power. For example, the inductance of the reactor L4 is 1 H, Vm=1 V, Vc=1.14 V, and 45 mW is adopted as the power that makes the power factor maximum. At this time, Ts=0.194. This corresponds to a phase of $\phi\approx 70$ (degrees). Thus, in the graph shown in FIG. 7, the reactor current il increases when the phase $\omega t$ is 0 to 70 degrees. The reactor current il decreases when the phase $\omega t$ is 70 to 180 degrees, and keeps a value of 0 after reaching 0 even if the phase $\omega t$ proceeds.

As will be described below, the phase at which the reactor current il decreases to reach a value of 0 is about 170 degrees. Likewise, in the range where the phase $\omega t$ is 180 degrees to 360 degrees, the reactor current il increases to have a maximum value during a time period over which the phase $\omega t$ is 180 degrees to about 250 (=180+70) degrees, and decreases to reach a value of 0 when the phase $\omega t$ is about 250 to about 350 (=170+180) degrees.

When Vm=1 and Im=$\sqrt{2}$ adopted in the above description are used, the power is calculated to be $1/2\sqrt{2}$. Thus, the inductance of the reactor L4 is $(0.045\times 1)/(1/2\sqrt{2})=0.127$ (H) when it is calculated on the basis of Suga, Kimata, Uchida, "A Simple Switching Method for A Improved Power Factor Type Single Phase Converter", The transactions of the Institute of Electrical Engineers of Japan D, Vol. 116, No. 4, pp. 420-426, 1996, with the frequency of the single-phase AC voltage Vin being 1 Hz.

In accordance with Suga, Kimata, Uchida, "A Simple Switching Method for A Improved Power Factor Type Single Phase Converter", The transactions of the Institute of Electrical Engineers of Japan D, Vol. 116, No. 4, pp. 420-426, 1996, a more specific waveform of the reactor current il is calculated. In a time period over which the switch Sl is conducting, $il=Ip\cdot(1-\cos(\omega t))$. Because Vm=1, $Ip=1/(2\pi)/0.127=1.253$. Thus, in FIG. 7, the local maximum value of the reactor current il is $1.253\times(1-\cos(\phi))=0.82$ ($\phi$=70 (degrees)).

When il>0 in the time period over which the switch Sl is not conducting, $il=Ip\cdot(1-\cos(\omega t))-(Vc/L)\cdot(\omega t-\phi)/\omega$. Here, the value L is the inductance of the reactor L4. In the above-described example, Vc/L=1.14/0.127=8.976.

G. Behavior of Quantities

Figure 8:
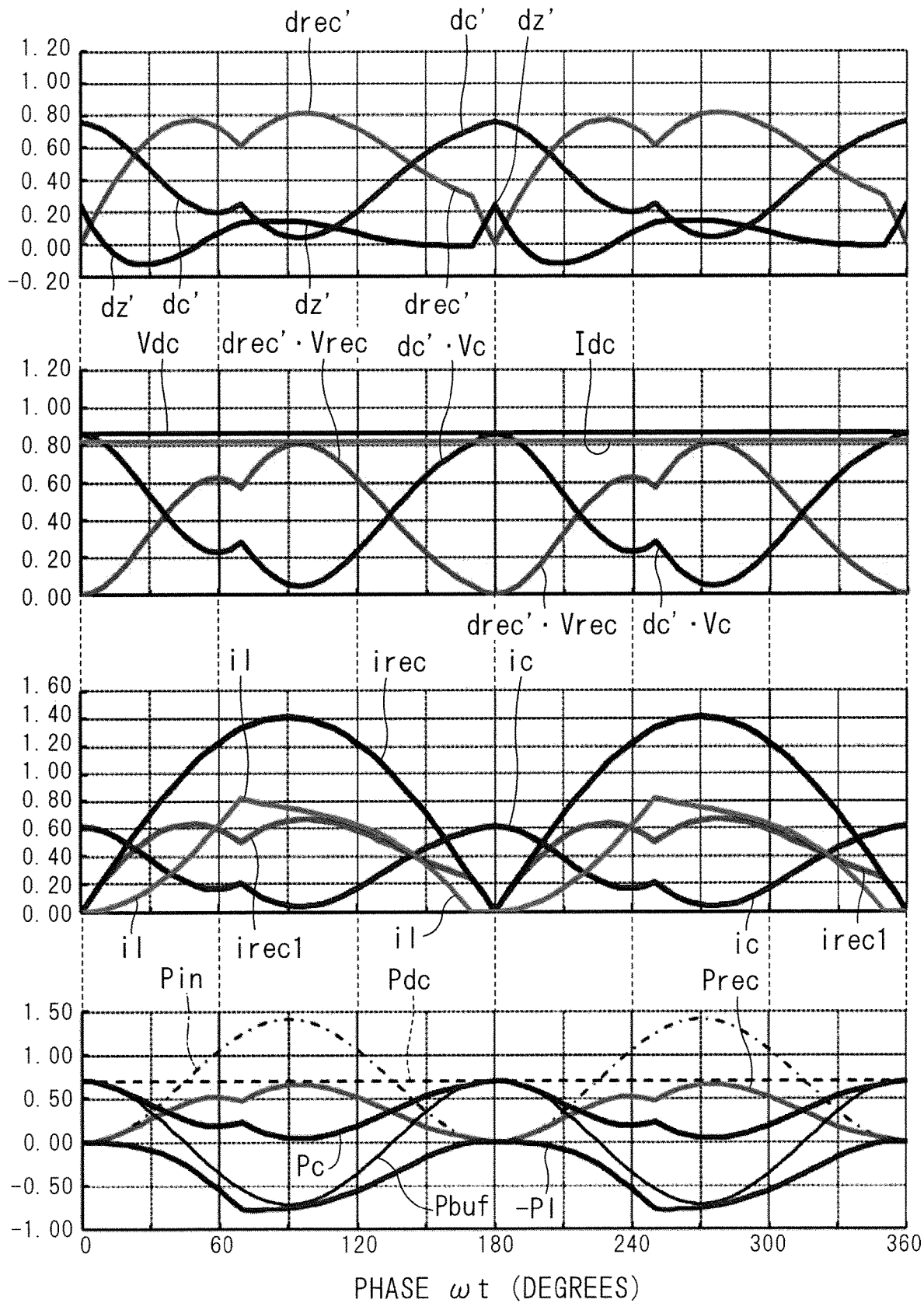
FIG. 8 includes graphs showing an operation of the direct power converter.

FIG. 8 includes graphs showing an operation of the direct power converter illustrated in FIG. 1, and illustrates an operation in a case where the duties drec', dc', and dz' (=1-drec'-dc') are set on the basis of the present embodiment. The waveform illustrated in FIG. 7 is adopted as the waveform of the reactor current il.

Also in FIG. 8, individual values are converted with the amplitude Im being $\sqrt{2}$ and the amplitude Vm being 1, Vc=1.14 Vm and Vdc=0.86 Vm are set. Thus, these conditions are the same as in FIG. 6. FIG. 8 illustrates the quantities similarly to FIG. 6. Specifically, the top graph shows the duties drec', dc', and dz'; the second graph from the top shows the DC voltage Vdc, the voltages drec'·Vrec and dc'·Vc (see Equation (19)) that constitute the DC voltage Vdc, and the DC current Idc; the third graph from the top shows the currents irec, ic, il, and irec1; and the bottom graph shows the instantaneous powers Pin, Pdc, Pbuf, Pc, –Pl, and Prec.

When simple switching is adopted to cause the reactor current il to flow through the power buffer circuit 4, control using the rectification duty drec' and the discharge duty dc' makes not only the inverter input power Pdc but also the DC voltage Vdc and the DC current Idc constant, and also causes the waveform of the current irec to exhibit the absolute value of a sine wave. Accordingly, it is understood that the waveform of the input current Iin is sinusoidal.

In addition, it is understood from the waveforms of the instantaneous powers Pin, Pdc, and Pbuf that the power buffer circuit 4 functions as a power buffer.

Note that, in the case illustrated in FIG. 8, there is a phase region where dz'<0. In this region, the rectification duty drec' and the zero duty dz' are corrected to achieve drec'=1-dc' and dz'=0. The correction of the rectification duty for obtaining a non-negative zero duty in all the phases is known from, for example, Japanese Patent No. 5794273, and thus the details thereof is omitted here.

Figure 9:
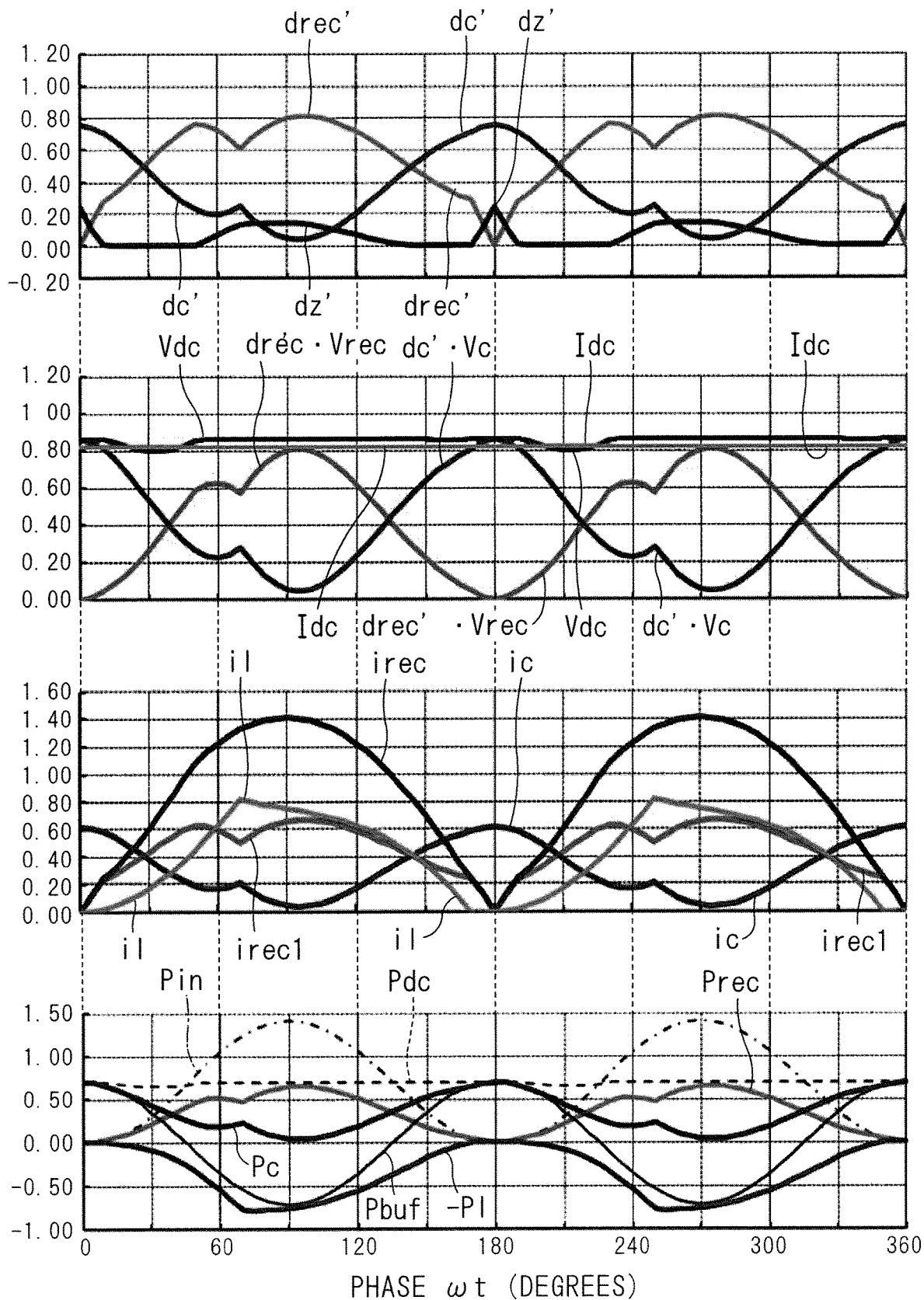
FIG. 9 includes graphs showing an operation of the direct power converter.

In FIG. 9, individual values are converted with the amplitude Im being $\sqrt{2}$ and the amplitude Vm being 1, Vc=1.14 Vm is set. Note that Equation (19) does not hold in the region where drec'=1-dc'. Thus, in the region where dz'=0, the DC voltage Vdc is under 0.86 Vm, and the minimum value of the DC voltage Vdc is 0.80 Vm. Accordingly, it is understood that the waveform of the current irec is slightly distorted from the absolute value of a sine wave in the region where dz'=0. Thus, it is understood that, although the inverter input power Pdc is also slightly distorted from a constant value relative to the phase, the power buffer circuit 4 functions as a power buffer.

When such distortion is beyond the allowance of distortion of the input current Iin from a sinusoidal waveform, the zero duty can be made non-negative by using another method.

FIG. 10 includes graphs showing an operation of the direct power converter illustrated in FIG. 1, and illustrates an operation in a case where the duties drec', dc', and dz' (=1-drec'-dc') are set on the basis of the present embodiment. The waveform illustrated in FIG. 7 is adopted as the waveform of the reactor current il. The quantities are illustrated in FIG. 10 similarly to FIG. 8.

Also in FIG. 10, individual values are converted with the amplitude Im being $\sqrt{2}$ and the amplitude Vm being 1. Note that, although Vc=1.14 Vm, the DC voltage Vdc is lower than in FIG. 8 and FIG. 9, that is, Vdc=0.76 Vm.

Such a lower DC voltage Vdc makes the original rectification duty drec and the original discharge duty dc lower (see Equations (7) and (8)) and makes the rectification duty drec' and the discharge duty dc' lower accordingly, and the minimum value of dz' can be 0 in all the phases in the control using these duties.

Increasing the command value Vc* with reference to Equation (8) (performing control to increase the voltage Vc across the capacitor C4) makes the original discharge duty dc lower (see Equation (8)) and makes the discharge duty dc' lower accordingly, and dz'≥0 can be satisfied in all the phases in the control using these duties. Note that, in this case, the quantities described above in "F. Example of reactor current il" are changed, or the power factor of the power buffer circuit 4 fluctuates.

H. Decrease in Size of Reactor and Improvement of DC Voltage Vdc (h-1) Relationship Between Boost Operation and Inductance When simple switching is adopted in the present embodiment, the inductance required for the reactor increases compared with the technique exemplified in Uesgi and four others, "Single-Phase Twice voltage PFC Converter for air conditioner", The transactions of the Institute of Electrical Engineers of Japan D, Vol. 119, No. 5, pp. 592-598, 1999. This is because, in the present embodiment, unlike in the technique exemplified in Uesgi and four others, "Single-Phase Twice voltage PFC Converter for air conditioner", The transactions of the Institute of Electrical Engineers of Japan D, Vol. 119, No. 5, pp. 592-598, 1999, a boost operation is performed in simple switching.

Uesgi and four others, "Single-Phase Twice voltage PFC Converter for air conditioner", The transactions of the Institute of Electrical Engineers of Japan D, Vol. 119, No. 5, pp. 592-598, 1999 exemplifies the case of obtaining a DC voltage of 270 V from a power supply of 100 V (an effective voltage value of 100 V in single phase) by using voltage-doubling rectification. When the inductance is converted to 1 H and the peak value of the voltage corresponding to the amplitude Vm of the present embodiment is converted to 1 V, $Vc=270/2/(100\times\sqrt{2})\approx0.95$. In addition, Uesgi and four others, "Single-Phase Twice voltage PFC Converter for air conditioner", The transactions of the Institute of Electrical Engineers of Japan D, Vol. 119, No. 5, pp. 592-598, 1999 exemplifies a case where the input power is 1800 W and where the time period over which the switch is conducting is 2.8 ms in a switching period of 50 Hz. In this case, $Ts=(2.8/1000)\times50=0.14$. At this time, in view of the graph illustrated in FIG. 10 of Uesgi and four others, "Single-Phase Twice voltage PFC Converter for air conditioner", The transactions of the Institute of Electrical Engineers of Japan D, Vol. 119, No. 5, pp. 592-598, 1999, the power that makes the power factor maximum is about 30 mW. Compared with this power, the power (45 mW) exemplified in the description using FIG. 7 is high. This is because, in the present embodiment, $Vc=1.14$ (>0.96) is obtained through a boost operation.

According to the equation for calculating an inductance shown in Uesgi and four others, "Single-Phase Twice voltage PFC Converter for air conditioner", The transactions of the Institute of Electrical Engineers of Japan D, Vol. 119, No. 5, pp. 592-598, 1999, the value of the inductance is calculated as follows: $30 [mW]\times(100 [V]\times\sqrt{2})^2/1800 [W]/50 [Hz]=6.7 [mH]$. On the other hand, in a circuit constant table, the value of the inductance is 6.2 mH. The value of the inductance necessary for voltage-doubling rectification exemplified in Uesgi and four others, "Single-Phase Twice voltage PFC Converter for air conditioner", The transactions of the Institute of Electrical Engineers of Japan D, Vol. 119, No. 5, pp. 592-598, 1999 is assumed to be about 6.5 mH. This is converted to $6.5 [mH]\times(200/100)^2=26 [mH]$ when a power supply of 200 V is used.

In contrast to Uesgi and four others, "Single-Phase Twice voltage PFC Converter for air conditioner", The transactions of the Institute of Electrical Engineers of Japan D, Vol. 119, No. 5, pp. 592-598, 1999, the power is 45/30 times in the present embodiment. When the single-phase AC power supply 1 according to the present embodiment is a power supply of 200 V, Vm=230 V. Thus, compared with voltage-doubling rectification adopted in Uesgi and four others, "Single-Phase Twice voltage PFC Converter for air conditioner", The transactions of the Institute of Electrical Engineers of Japan D, Vol. 119, No. 5, pp. 592-598, 1999, an influence of full-wave rectification adopted in the present embodiment on the inductance is $(230/100)^2$ times. Thus, a necessary value of the inductance is $6.5 [mH]\times45/30\times(230/100)^2\approx52 [mH]$.

Accordingly, the adoption of the simple switching exemplified in Uesgi and four others, "Single-Phase Twice voltage PFC Converter for air conditioner", The transactions of the Institute of Electrical Engineers of Japan D, Vol. 119, No. 5, pp. 592-598, 1999 in the power buffer circuit 4 in which a boost operation is performed is likely to increase the inductance of the reactor L4 (about twice in the above example).

(h-2) Relationship Between Decrease in Inductance and DC Voltage Vdc

Suga, Kimata, Uchida, "A Simple Switching Method for A Improved Power Factor Type Single Phase Converter", The transactions of the Institute of Electrical Engineers of Japan D, Vol. 116, No. 4, pp. 420-426, 1996 introduces a technique for delaying the starting time of conduction of a switching element. According to this technique, a large power factor can be obtained even when the inductance is small.

Figure 11:
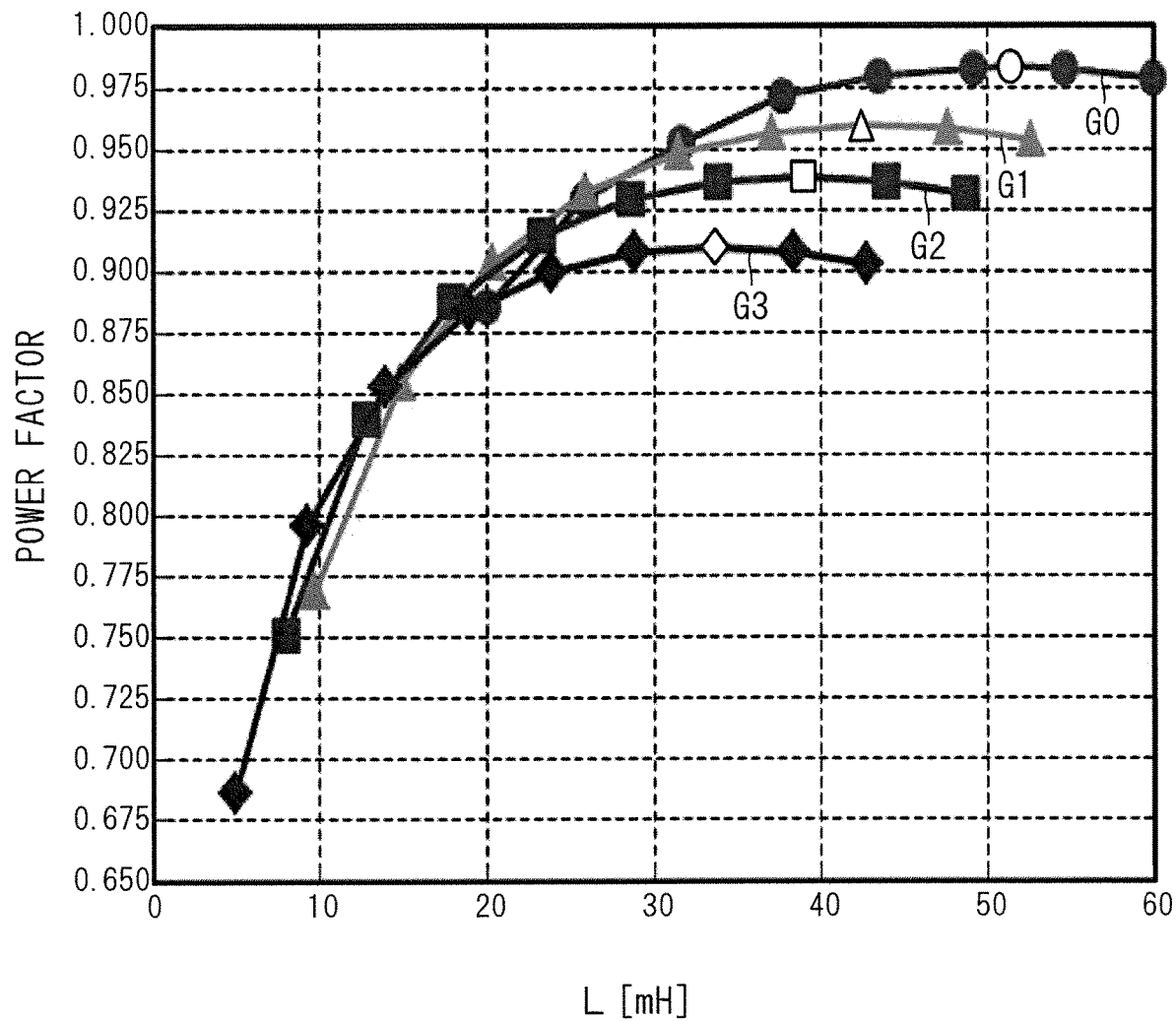
FIG. 11 is a graph showing a relationship between inductance and power factor.

FIG. 11 is a graph showing the relationship between an inductance L and a power factor when a power of 1.84 kW (an effective voltage value of 230 V and an effective current value of 8 A) is adopted in the present embodiment on the basis of Suga, Kimata, Uchida, "A Simple Switching Method for A Improved Power Factor Type Single Phase Converter", The transactions of the Institute of Electrical Engineers of Japan D, Vol. 116, No. 4, pp. 420-426, 1996. Note that the frequency of the single-phase AC voltage Vin is 50 Hz. Graphs G0, G1, G2, and G3 respectively show the cases where the phase at which the switch Sl is brought into conduction (hereinafter referred to as a "conduction start phase") is 0 degrees, 27 (=360×0.075) degrees, 36 (=360× 0.1) degrees, and 45 (=360×0.125) degrees relative to a reference phase at which the rectified voltage Vrec is 0.

It is understood from these graphs that the inductance L has a value that makes the power factor maximum. In each of the graphs G0, G1, G2, and G3, the data that makes the power factor maximum is plotted in white.

The power factor decreases as the conduction start phase increases. However, the value of the inductance L that makes the power factor maximum decreases as the conduction start phase increases.

For example, in the graph G0, the power factor is maximum when the inductance L is 51.37 mH. In the cases illustrated in FIG. 8, FIG. 9, and FIG. 10, under the conditions where the frequency is 50 Hz, the effective voltage value is 230 V, and the effective current value is 8 A, the inductance L that makes the power factor maximum is 51.75 mH ($=0.045\times(230\times\sqrt{2})^2/(1840\times50)$ (H)), which is almost equal to a value of the inductances L that make the power factor maximum.

When the direct power converter according to the present embodiment is adopted to a compact air conditioner used with a power of, for example, 2 kW or less, it is desired that the inductance of the reactor L4 be set to 15 mH to 30 mH and a compact component be adopted accordingly.

For example, when an inductance L of about 28 mH is adopted, it is desired that the conduction start phase be 45 degrees (see the graph G3) from the viewpoint of a flat power factor characteristic. However, from the viewpoint of increasing the power factor, it is desired that the conduction start phase be 36 degrees (see the graph G2). In the description given below, the conduction start phase is 36 degrees in all the cases.

Figure 12:
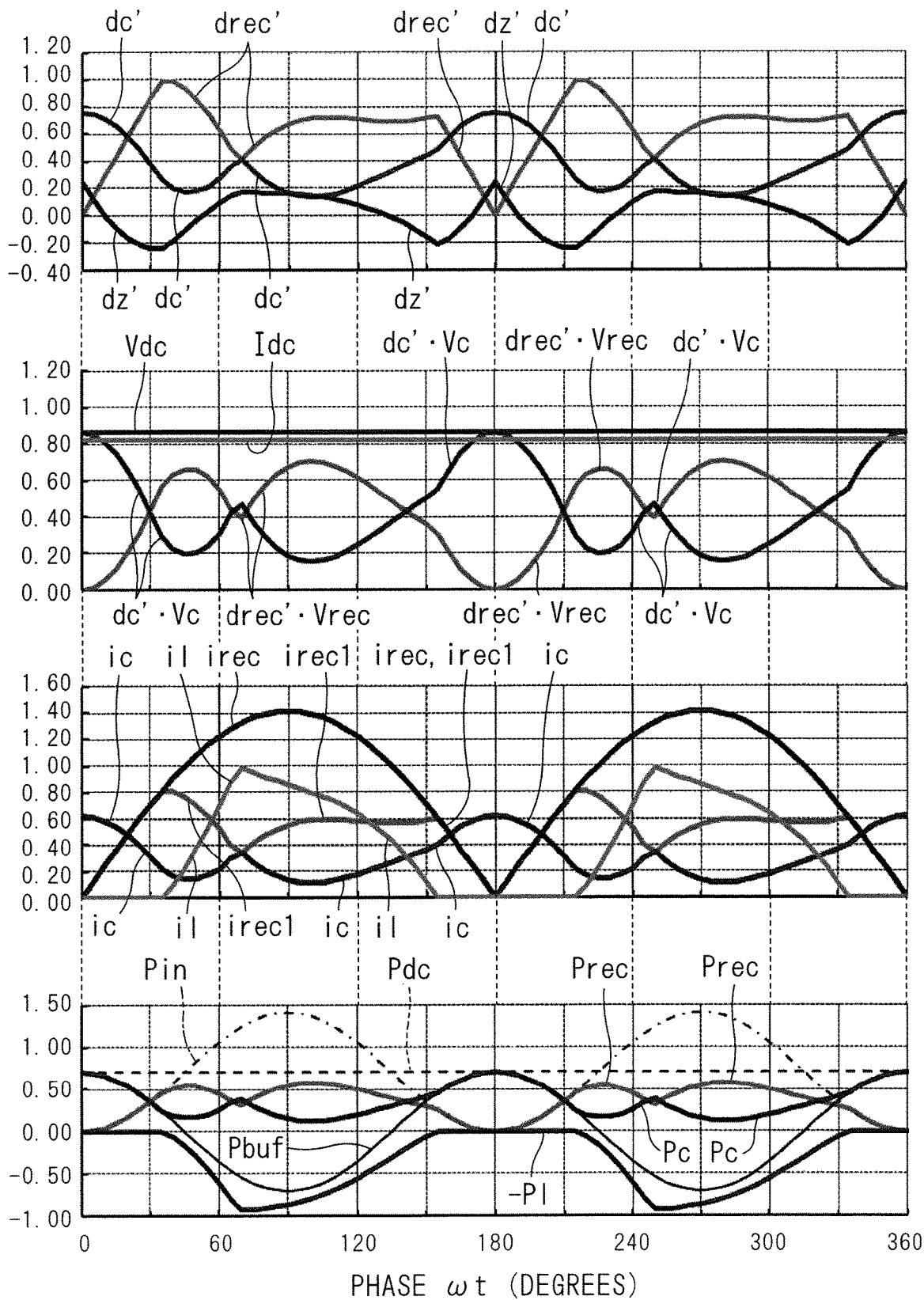
FIG. 12 includes graphs showing an operation of the direct power converter.
Figure 13:
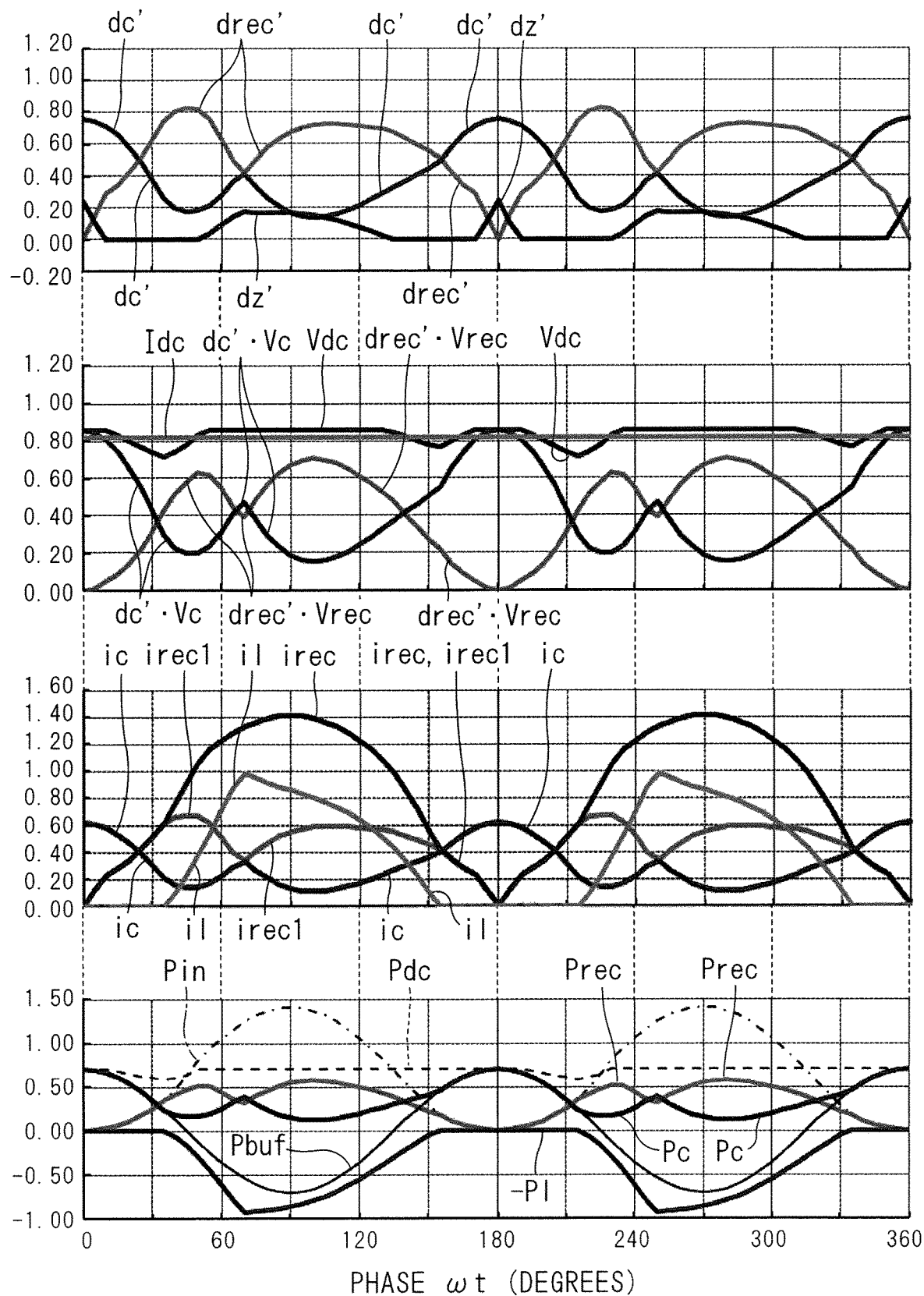
FIG. 13 includes graphs showing an operation of the direct power converter.
Figure 14:
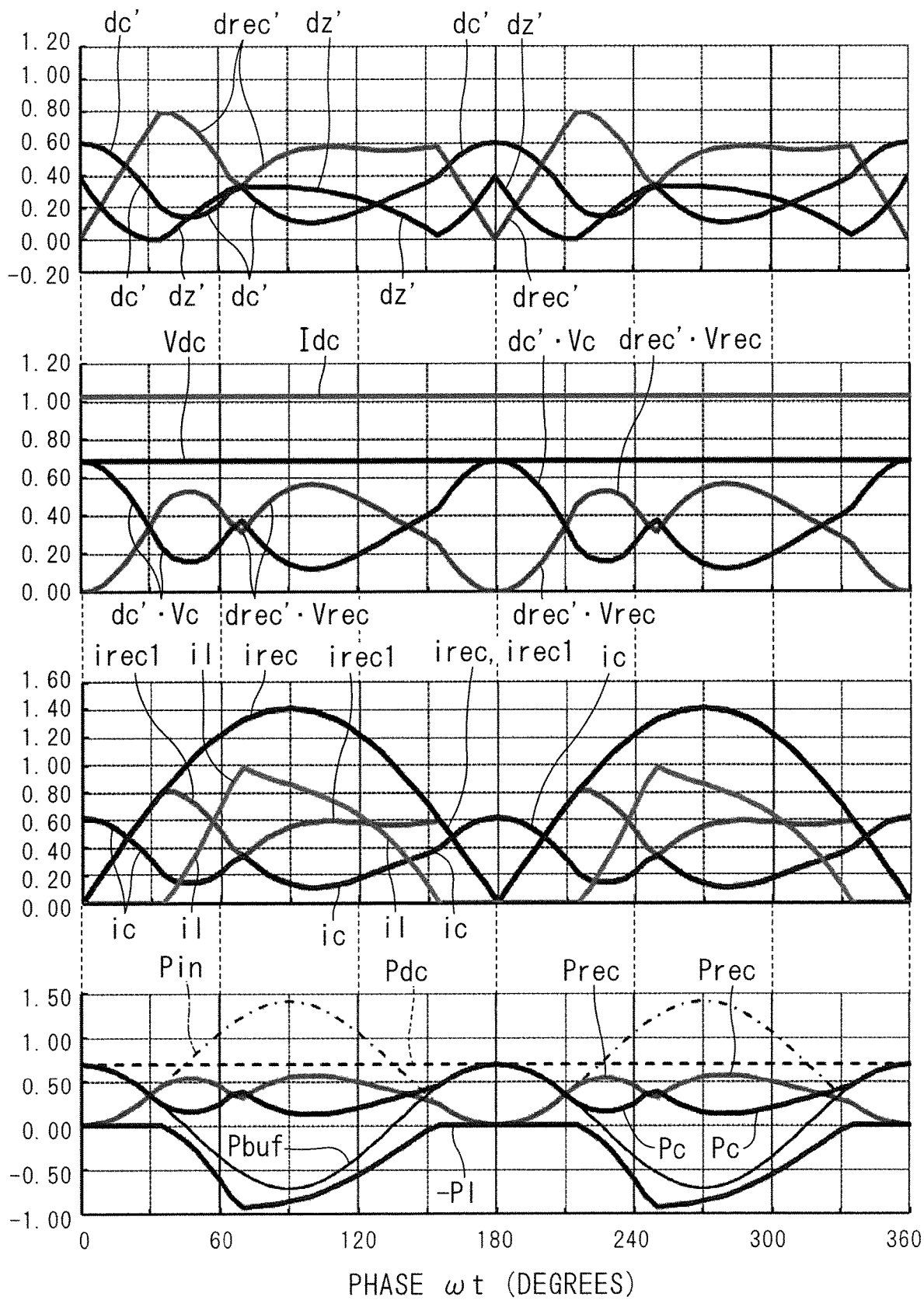
FIG. 14 includes graphs showing an operation of the direct power converter.

FIG. 12 to FIG. 14 each include graphs showing an operation of the direct power converter illustrated in FIG. 1. In these figures, as in FIG. 8 to FIG. 11, graphs are drawn with Vc being 1.14 Vm, the amplitude Im being √2, and the amplitude Vm being 1.

A power of 1.84 kW (an effective voltage value of 230 V and an effective current value of 8 A) is adopted, and the inductance L is set to 28.54 mH. The conduction start phase is 36 degrees, and thus the phase at which the switch S1 shifts from a conduction state to a non-conduction state is about 68 (360×0.19) degrees. At this phase, the reactor current il has a maximum value. After that, the reactor current il decreases as the phase increases, and the reactor current il becomes 0 at about 155 (360×0.430) degrees.

In the present embodiment, full-wave rectification is performed, and thus the switch S1 is conducting when the phase is in the range from about 216 (=36+180) degrees to about 248 (=68+180) degrees, and the reactor current il flows when the phase is in the range from about 216 degrees to about 335 (=155+180) degrees and has a maximum value even when the phase is about 248 (=68+180) degrees.

The cases illustrated in FIG. 8 to FIG. 11 correspond to a case where a power of 1.84 kW (an effective voltage value of 230 V and an effective current value of 8 A) is adopted and the inductance L is set to 51.37 mH. The reactor current il flows when the phase is in the range from 0 degrees to about 170 (=360×0.471) degrees and in the range from 180 degrees to about 350 (=170+180) degrees, and has a maximum value when the phase is about 70 (=360×0.194) degrees and about 250 (=70+180) degrees.

FIG. 12 illustrates an operation in a case where the rectification duty drec' is set on the basis of Equation (13), the discharge duty dc' is set on the basis of Equation (18), the zero duty dz' is set by 1−drec'−dc', and Vdc is set to 0.86 Vm, as in the conditions used in FIG. 8.

FIG. 12 illustrates quantities similarly to FIG. 8. Specifically, the top graph shows the duties drec', dc', and dz'; the second graph from the top shows the DC voltage Vdc, the voltages drec'·Vrec and dc'·Vc that constitute the DC voltage Vdc, and the DC current Idc; the third graph from the top shows the currents irec, ic, il, and irec1; and the bottom graph shows the instantaneous powers Pin, Pdc, Pbuf, Pc, −Pl, and Prec.

As in the description using FIG. 8, it is understood that there is a phase region where dz'<0 with the waveform of the input current Iin being sinusoidal. Furthermore, in this region, the absolute value of the zero duty dz' is larger in the case illustrated in FIG. 12 than in the case illustrated in FIG. 8.

FIG. 13 illustrates quantities in a case where drec'=1−dc' and dz'=0 is adopted in the region where 1−drec'−dc'<0, as in the conditions used in FIG. 9. FIG. 13 illustrates quantities similarly to FIG. 12. As in the description using FIG. 9, in the region where dz'=0, the DC voltage Vdc is under 0.86 Vm, and the waveform of the current irec is distorted from the absolute value of a sine wave. The minimum value of the DC voltage Vdc is 0.72 Vm in FIG. 13, which is lower than 0.80 Vm, which is the minimum value in FIG. 9.

FIG. 14 illustrates quantities in a case where the DC voltage Vdc is set so that there is not a phase region where dz'=1−drec'−dc'<0, with the DC voltage Vdc being constant, and corresponds to FIG. 10. Under the conditions used in FIG. 10, dz'≥0 can be satisfied when Vdc=0.76 Vm. Under the conditions used in FIG. 14, the inductance L is 28.54 mH and the conduction start phase is 36 degrees, and thus it is necessary to decrease Vdc to 0.69 Vm to satisfy 1−drec'−dc'≥0.

The cause of a decrease in the minimum value of the DC voltage Vdc that fluctuates and a decrease in the maximum value of the DC voltage Vdc that can be constant may be that a decrease in the inductance L causes a shorter time period over which the reactor current il flows and that the reactor current il contains many harmonic components (specifically, the third- or higher-order odd harmonic components of the frequency of the single-phase AC voltage Vin).

(h-3) Control on Harmonics and Improvement of DC Voltage Vdc

Harmonics are controlled by, for example, the standard IEC 61000-3-2. For example, in the reactor current il exemplified in FIG. 12 to FIG. 14, the magnitude of a third-order harmonic component is larger than that in the standard IEC 61000-3-2. Since irec=irec1+il (see FIG. 1 and FIG. 4), the third-order harmonic component of the reactor current il is reflected as is in the current irec and affects the third-order harmonic component of the input current Iin accordingly. Hereinafter, a technique for reducing harmonics contained in the reactor current il will be considered.

FIG. 15 is a graph showing the waveform of the reactor current il exemplified in FIG. 12 to FIG. 14 in the half-period of the single-phase AC voltage Vin, specifically, when the phase ωt is 0 to 180 degrees. Also when the phase ωt is 180 to 360 degrees, the reactor current il has the same waveform. As in the above case, a power of 1.84 kW (an effective voltage value of 230 V and an effective current value of 8 A) is adopted, and the inductance L is set to 28.54 mH. The reactor current il is shown with the amplitude Im being √2.

For example, in the standard IEC 61000-3-2, a third-order harmonic component of up to an effective value of 2.30 A is allowed under the condition of a rated voltage of 230 V. On the other hand, the reactor current il illustrated in FIG. 15 contains a third-order harmonic component of an effective value of 2.87 A when the effective voltage value is 230 V, and harmonic components of other orders are within an allowable range of the standard IEC 61000-3-2. Thus, to reduce the third-order harmonic component of 0.571 (=2.87−2.30) A, which is subtracted from the reactor current il as the amount of correction.

FIG. 16 is a graph showing the waveform of the input current Iin when the amount of correction is subtracted from the reactor current il as described above. Note that Vc=1.14 Vm, the amplitude Vm is 1, and the amplitude Im of the input current Iin before subtraction of the amount of correction is √2. As a result of subtracting the amount of correction, the harmonics of the input current Iin become within the allowable range of the standard IEC 61000-3-2.

To perform such subtraction of the amount of correction, a rectification duty drec", a discharge duty dc", and a zero duty dz" are set in the following manner.

First, an amount of correction il' of the reactor current il is introduced. In the example given above, the amount of correction il' is the amount of reduction (0.571 A) in the third-order harmonic component of the reactor current il. In Equation (12), the amount of deviation of the reactor current il from the value il0, (il−i0) is used. Thus, to calculate the rectification duty drec" from the original rectification duty drec by subtracting the amount of correction il', the rectification duty drec' may be replaced with the rectification duty drec" and the amount of deviation (il−i0) may be replaced with a value (−il′) in formally in Equation (12). Furthermore, Equation (27) is obtained in view of Equation (7).

[Math. 27]

$$drec'' = drec + \left(\frac{il'}{Idc}\right) \qquad (27)$$
$$= \frac{Vdc}{Vm} \cdot |\sin(\omega t)| + \left(\frac{il'}{Idc}\right)$$

Likewise, the discharge duty dc′ is replaced with the discharge duty dc″ and the amount of deviation (i1−i0) is replaced with the value (−il′) formally in Equation (14), so that Equation (28) is obtained. Furthermore, Equation (29) is obtained in view of Equation (8).

[Math. 28]

$$Vc* \cdot Idc \cdot (dc'' - dc) = -il' \cdot Vm \cdot |\sin(\omega t)| \qquad (28)$$

[Math. 29]

$$dc'' = dc - \frac{\left(\frac{il'}{Idc}\right) \cdot Vm \cdot |\sin(\omega t)|}{Vc*} \qquad (29)$$
$$= \frac{Vdc}{Vc*} \cdot \cos^2(\omega t) - \left(\frac{il'}{Idc}\right) \cdot \left(\frac{Vm}{Vc*}\right) \cdot |\sin(\omega t)|$$

Calculation is performed similarly to Equation (19) by using the rectification duty drec″ and the discharge duty dc″ obtained in this manner, so that Equation (30) is obtained. That is, it is understood that the adoption of the rectification duty drec″ and the discharge duty dc″ enables control for making the DC voltage Vdc constant.

[Math. 30]

$$\begin{aligned} Vrec \cdot drec'' + Vc* \cdot dc'' &= Vrec \cdot [drec + il'/Idc] + \\ &\quad Vdc \cdot \cos^2(\omega t) + (il'/Idc) \cdot \\ &\quad Vm \cdot |\sin(\omega t)| \\ &= Vrec \cdot drec + Vrec \cdot (il'/Idc) + \\ &\quad Vdc \cdot \cos^2(\omega t) - (il'/Idc) \cdot Vrec \\ &= Vrec \cdot drec + Vdc \cdot \cos^2(\omega t) + \\ &\quad \left(\frac{il'}{Idc}\right)[Vrec - Vm \cdot |\sin(\omega t)|] \\ &= Vrec \cdot drec + Vdc \cdot \cos^2(\omega t) \\ &= Vdc \end{aligned} \qquad (30)$$

Figure 17:
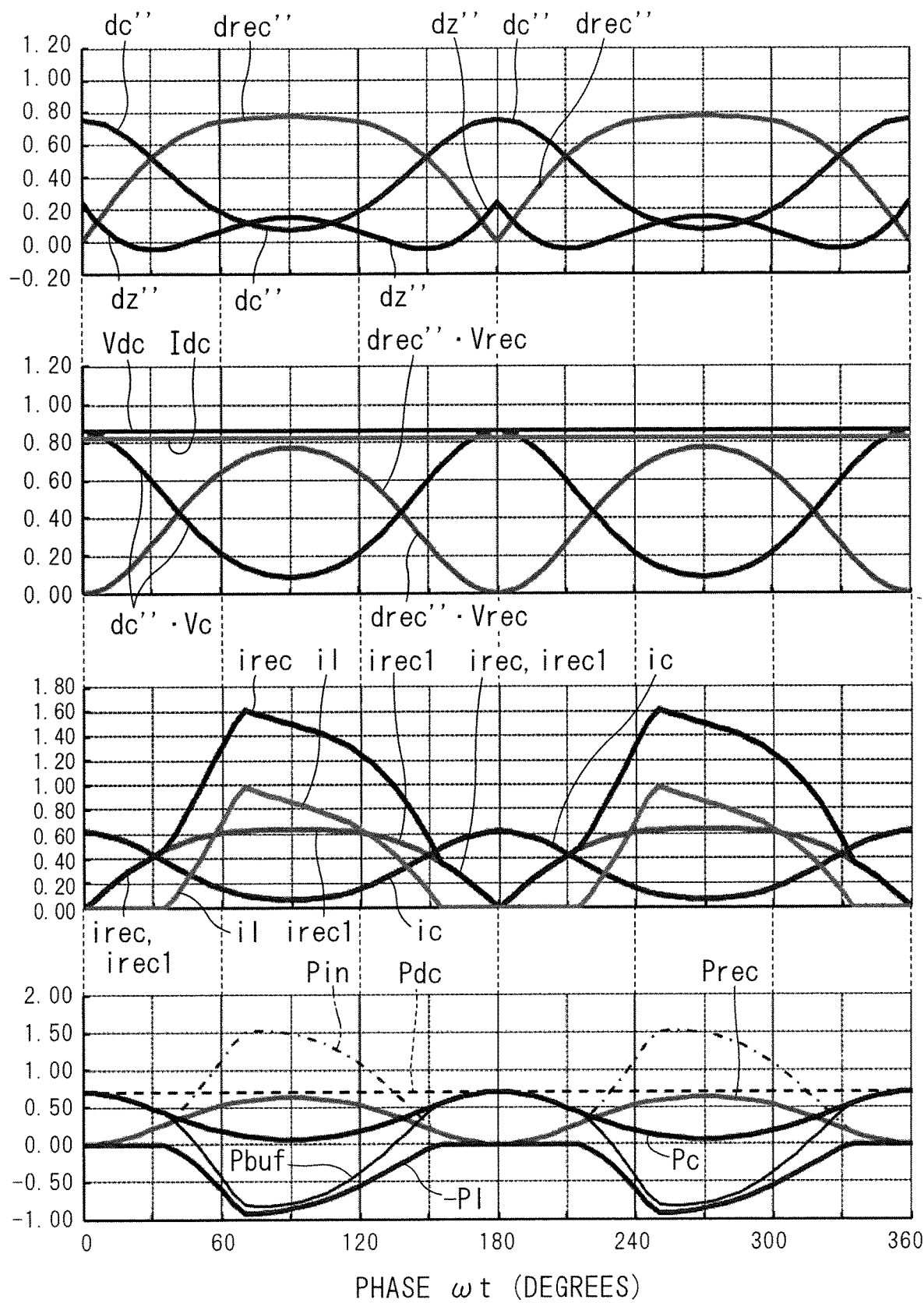
FIG. 17 includes graphs showing an operation of the direct power converter.

Note that, as described using FIG. 8 and FIG. 12, when the zero duty dz″ is set by 1−drec″−dc″, there is a phase region where dz″<0. FIG. 17 includes graphs showing quantities in a case where the rectification duty drec″ and the discharge duty dc″ are set by Equations (27) and (29), respectively, and the zero duty dz″ is set by 1−drec″−dc″, with the values of specifications corresponding to those in the description using FIG. 12. It is understood that there is a phase region where dz″<0.

Figure 18:
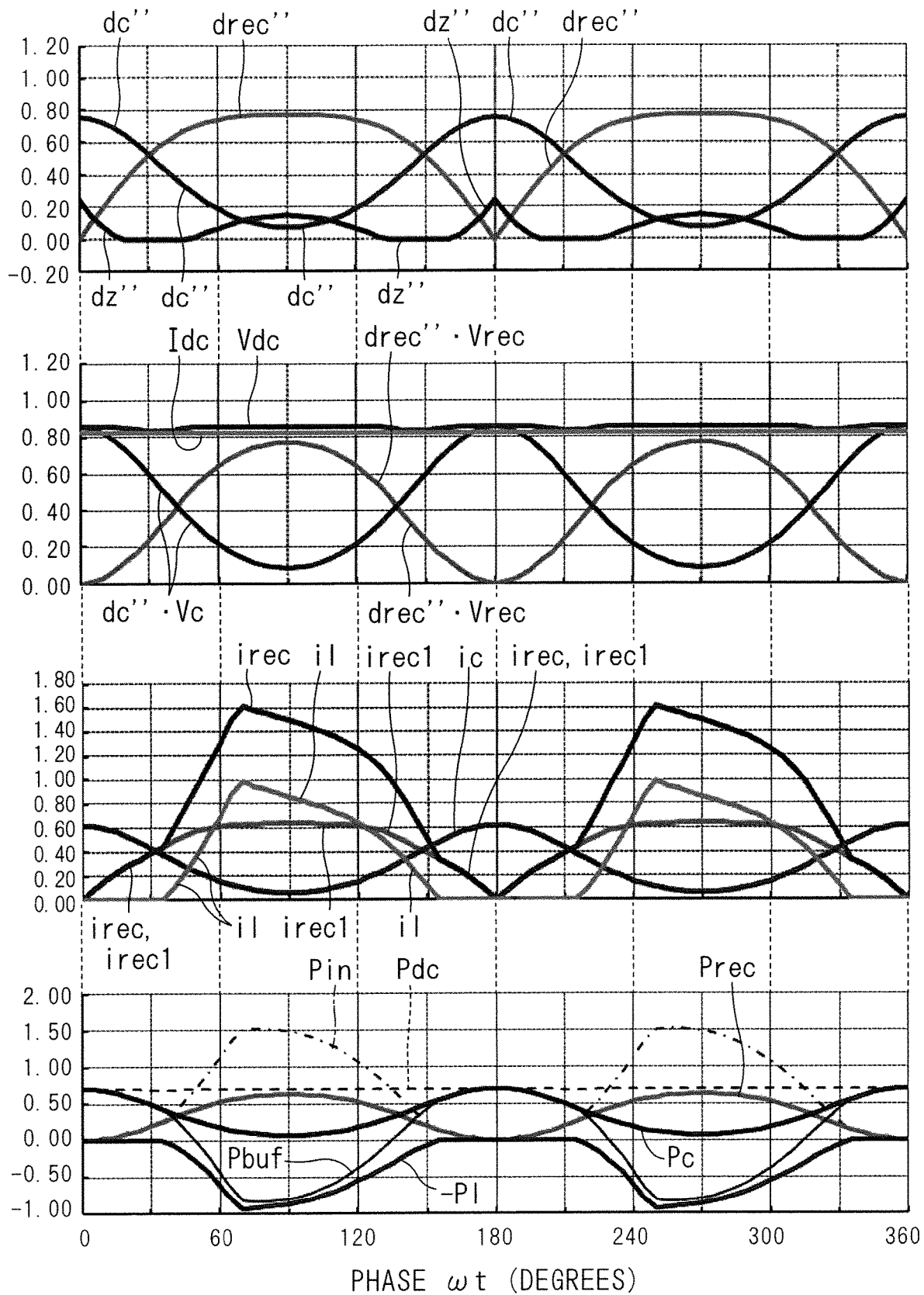
FIG. 18 includes graphs showing an operation of the direct power converter.

FIG. 18 includes graphs showing quantities in a case where the rectification duty drec″ and the discharge duty dc″ are set by Equations (27) and (29), respectively, the zero duty dz″ is set by 1−drec″−dc″, and modification is performed to satisfy dz″=0 and drec″=1−dc″ only in a phase where 1−drec″−dc″<0, with the values of specifications corresponding to those in the description using FIG. 13.

The zero duty dz″ illustrated in FIG. 17 is smaller in the absolute value of a negative value than the zero duty dz′ illustrated in FIG. 12. Thus, the minimum value of the DC voltage Vdc is larger in the case illustrated in FIG. 18 than in the case illustrated in FIG. 13. Specifically, in the region where dz″>0, the DC voltage Vdc is constant at 0.86 Vm, whereas when dz″=0 the minimum value of the DC voltage Vdc is 0.84 Vm (in the case illustrated in FIG. 13, the minimum value of the DC voltage Vdc is 0.72 Vm).

Figure 19:
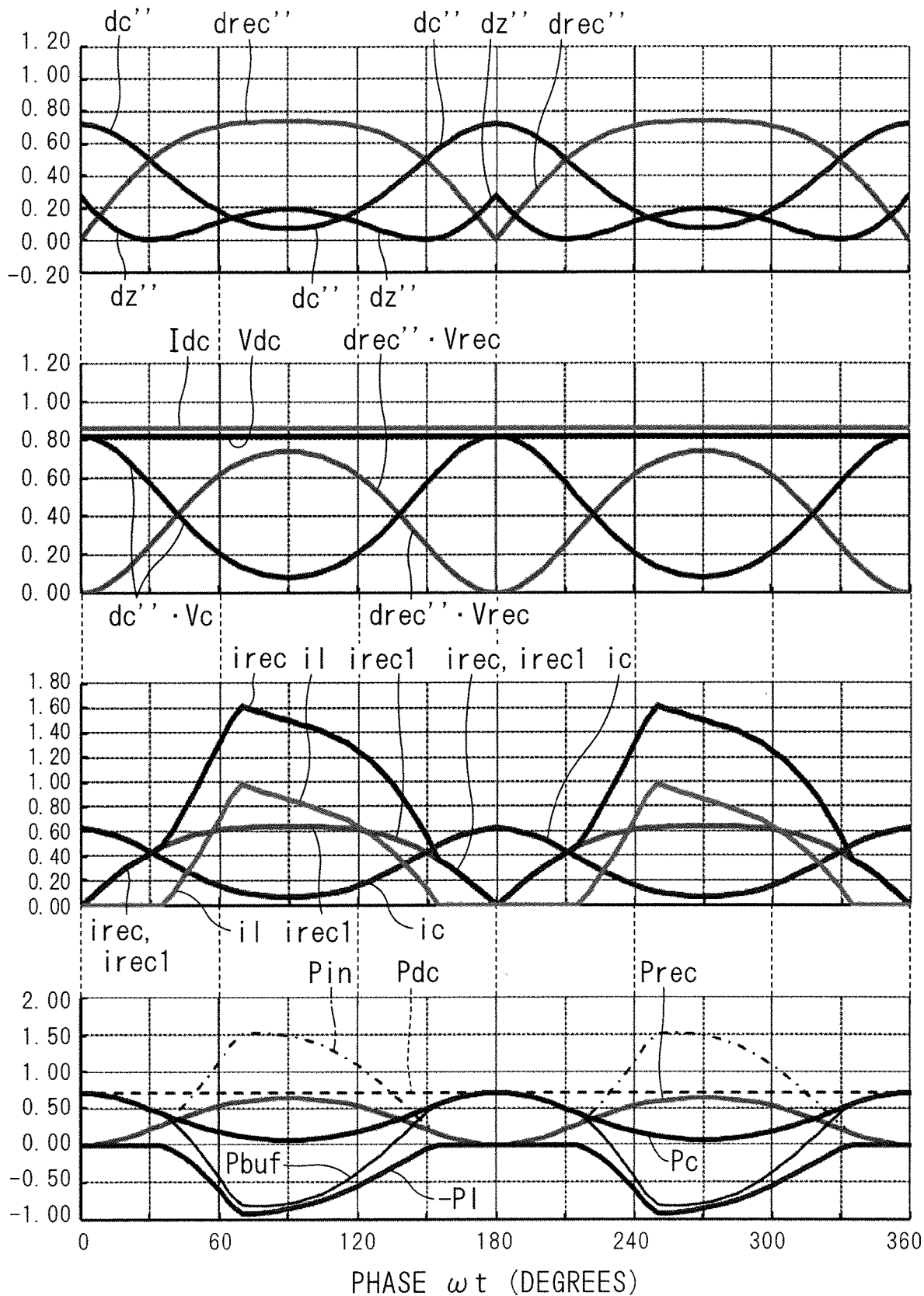
FIG. 19 includes graphs showing an operation of the direct power converter.

The DC voltage Vdc can be kept small and constant as in FIG. 14 while maintaining the rectification duty drec″, the discharge duty dc″, and dz″=1−drec″−dc″ in all the phases. FIG. 19 includes graphs showing quantities in a case where the rectification duty drec″, the discharge duty dc″, and the zero duty dz″ are set similarly to FIG. 17. Setting of Vdc=0.82 Vm enables the minimum value of the zero duty dz″ to be 0, not a positive value. That is, the maximum value of the DC voltage Vdc that can be kept constant is larger than in the case illustrated in FIG. 14 (Vdc=0.69 Vm).

As a result of decreasing the inductance L to reduce the size of the reactor L4 and suppressing harmonic components of the reactor current il generated accordingly in the manner described above, the DC voltage Vdc that can be used for power conversion by the inverter 5 is increased, with the harmonics of the input current Iin being reduced and distortion of the waveform of the input current Iin from a sinusoidal waveform being allowed.

A decrease in the inductance L causes an increase in components of the fifth- or higher-order harmonics of the reactor current il. Thus, it may be desirable to adopt other harmonic components as the amount of correction il′.

FIG. 20 is a graph showing the waveform of the reactor current il in the half-period of the single-phase AC voltage Vin, specifically, when the phase ωt is 0 to 180 degrees. Also when the phase ωt is 180 to 360 degrees, the reactor current il has the same waveform.

Here, as in the case described using FIG. 15, a power of 1.84 kW (an effective voltage value of 230 V and an effective current value of 8 A) is adopted, but the inductance L is 18 mH, which is smaller than in the case described using FIG. 15. The amplitude of the reactor current il is converted with the amplitude Im of the input current Iin being √2.

Since the conduction start phase is 36 degrees, the phase at which the switch Sl shifts from a conduction state to non-conduction state is about 61 (360×0.17) degrees. At this phase, the reactor current il has a maximum value. At about 141 (360×0.394) degrees, the reactor current il is 0.

For example, in the standard IEC 61000-3-2, a third-order harmonic component, a seventh-order harmonic component, and an eleventh-order harmonic component are allowed up to effective values of 2.30 A, 0.77 A, and 0.33 A, respectively, under the condition of a rated voltage of 230 V. On the other hand, when the effective voltage value is 230 V, the reactor current il illustrated in FIG. 20 contains a third-order harmonic component of an effective value of 3.66 A, a seventh-order harmonic component of an effective value of 1.17 A, and an eleventh-order harmonic component of an effective value of 0.38 A, and harmonic components of other orders are within an allowable range of the standard IEC 61000-3-2.

Thus, as the amount of correction il′, the sum of the third-order harmonic component of 1.36 (=3.66−2.30) A, the seventh-order harmonic component of 0.40 (=1.17−0.77) A, and the eleventh-order harmonic component of 0.05 (=0.38−0.33) A is adopted.

FIG. 21 is a graph showing the waveform of the input current Iin when the amount of correction il' is subtracted from the reactor current il as described above. Note that Vc=1.14 Vm, the amplitude Vm is 1, and the amplitude Im of the input current Iin before subtraction of the amount of correction il' is √2. As a result of subtracting the amount of correction il', the harmonic components of the input current Iin become within the allowable range of the standard IEC 61000-3-2.

Figure 22:
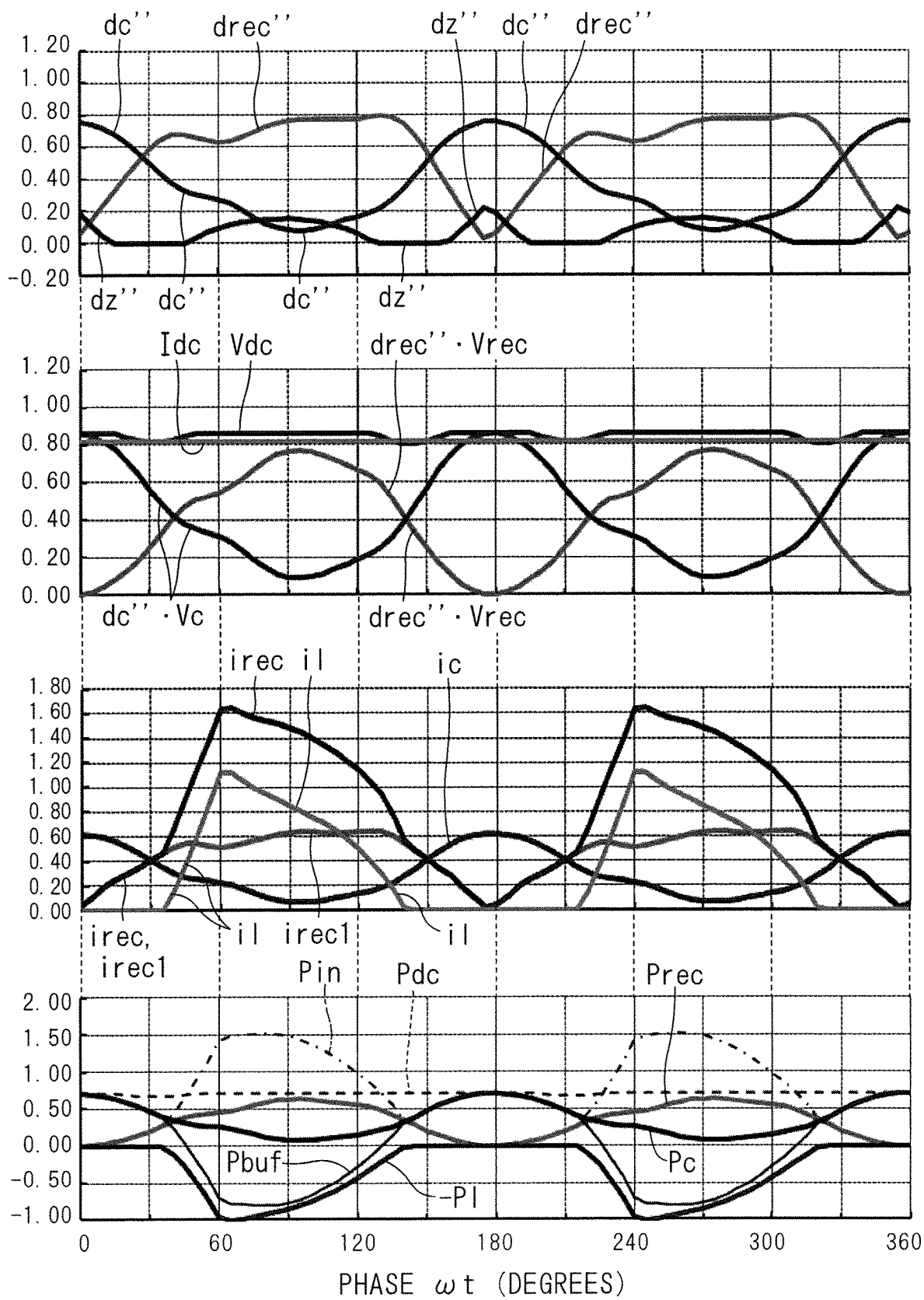
FIG. 22 includes graphs showing an operation of the direct power converter.

FIG. 22 includes graphs showing quantities in a case where the rectification duty drec" and the discharge duty dc" are set by Equations (27) and (29), respectively, the zero duty dz" is set by 1−drec"−dc", and modification is performed to satisfy dz"=0 and drec"=1−dc" only in a phase where 1−drec"−dc"<0, with the values of specifications other than the inductance L corresponding to those in the description using FIG. 18.

In the region where dz">0, the DC voltage Vdc is constant at 0.86 Vm, whereas when dz"=0 the minimum value of the DC voltage Vdc is 0.81 Vm. This is lower than the minimum value 0.84 Vm when the inductance L is 28 mH (in the case described using FIG. 18).

Figure 23:
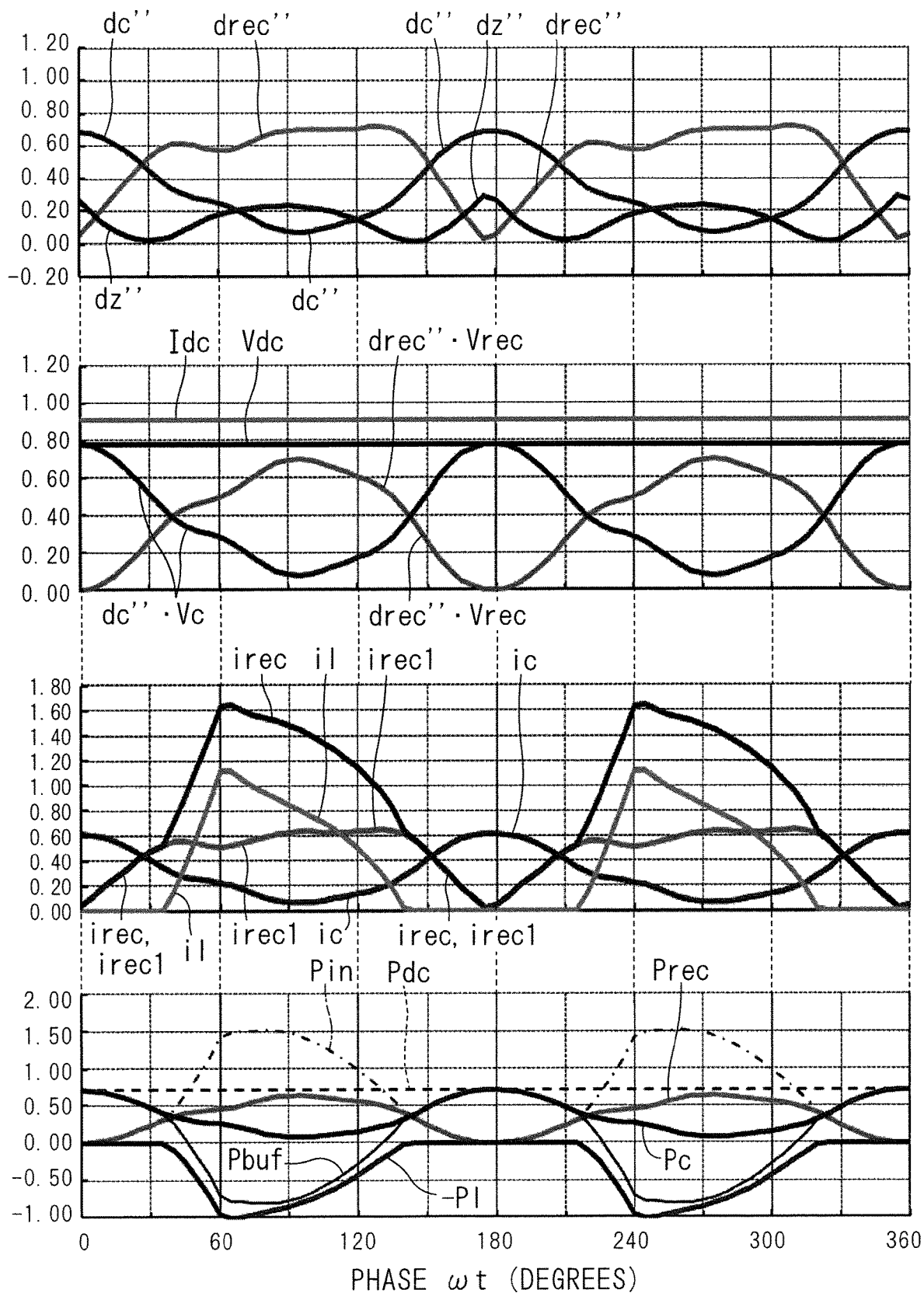
FIG. 23 includes graphs showing an operation of the direct power converter.

FIG. 23 includes graphs showing quantities in a case where Vdc=0.78 Vm. Such a setting enables the minimum value of the zero duty dz" to be 0, not a positive value. That is, even if the inductance L is small at about 18 mH, the adoption of the rectification duty drec", the discharge duty dc", and the zero duty dz" enables the maximum value of the DC voltage Vdc that is kept constant to be larger than in a case where the inductance L is about 51 mH, and the rectification duty drec', the discharge duty dc', and the zero duty dz' are adopted (see FIG. 10: Vdc=0.76 Vm). Furthermore, the harmonic components of the input current Iin can be within the allowable range of the standard.

On the basis of the similarity between Equations (12) and (27) and in view of Equation (7), the rectification duties drec' and drec" can be defined as follows:

the rectification duties (drec', drec") are set on the basis of the product $(Vdc/Vm) \cdot |\sin(\omega t)|$ of the ratio Vdc/Vm of the DC voltage Vdc to the amplitude Vm and the absolute value $|\sin(\omega t)|$ of the sinusoidal value of the phase ωt; and the ratio (il/Idc, il'/Idc) of the "current" (il, il') to the DC current Idc.

The foregoing product represents the original rectification duty drec (see Equation (7)). The foregoing "current" is the reactor current il for the rectification duty drec' and is the amount of correction il' for the rectification duty drec". The amount of correction il' is the amount of reduction in the harmonic component of the order to be reduced.

The rectification duty drec' has a value obtained by subtracting the ratio il/Idc from twice the product $(Vdc/Vm) \cdot |\sin(\omega t)|$ (see Equation (13)). The rectification duty drec" has a value obtained by adding the ratio il'/Idc to the product $(Vdc/Vm) \cdot |\sin(\omega t)|$ (see Equation (27)).

The discharge duty dc' can be expressed as follows on the basis of Equation (16):

set on the basis of the product $(Vdc/Vc) \cdot \cos(2\omega t)$ of the ratio Vdc/Vc of the DC voltage Vdc to the voltage Vc across the capacitor C4 (this accurately follows the command value Vc*) and the cosine value cos(2ωt) of the value twice the phase ωt; and the product $(Vm/Vc) \cdot (il/Idc) \cdot |\sin(\omega t)|$ of the ratio Vm/Vc of the amplitude Vm to the voltage Vc across the capacitor C4, the ratio il/Idc, and the absolute value $|\sin(\omega t)|$. Specifically, the value of the discharge duty dc' is equal to the sum of these two products.

The discharge duty dc" can be expressed as follows on the basis of Equation (29):

set on the basis of a first product $(Vdc/Vc) \cdot \cos^2(\omega t)$ of the ratio Vdc/Vc of the DC voltage Vdc to the voltage Vc across the capacitor C4 (this accurately follows the command value Vc*) and the square $\cos^2(\omega t)$ of the cosine value of the phase ωt; and a second product $(Vm/Vc) \cdot (il'/Idc) \cdot |\sin(\omega t)|$ of the ratio Vm/Vc of the amplitude Vm to the voltage Vc across the capacitor C4, the ratio il'/Idc, and the absolute value $|\sin(\omega t)|$. Specifically, the value of the discharge duty dc" is a value obtained by subtracting the second product from the first product. The first product represents the original discharge duty (see Equation (8)).

In the derivation of each of the foregoing rectification duties drec' and drec" and the discharge duties dc' and dc", the distortion of the reactor current il is not assumed to be resulted from simple switching. Thus, it is clear that the technique using the rectification duties drec' and drec" and the discharge duties dc' and dc" is not assumed to be based on simple switching.

(h-4) Exemplary Configuration for Obtaining Amount of Correction il'

Figure 24:
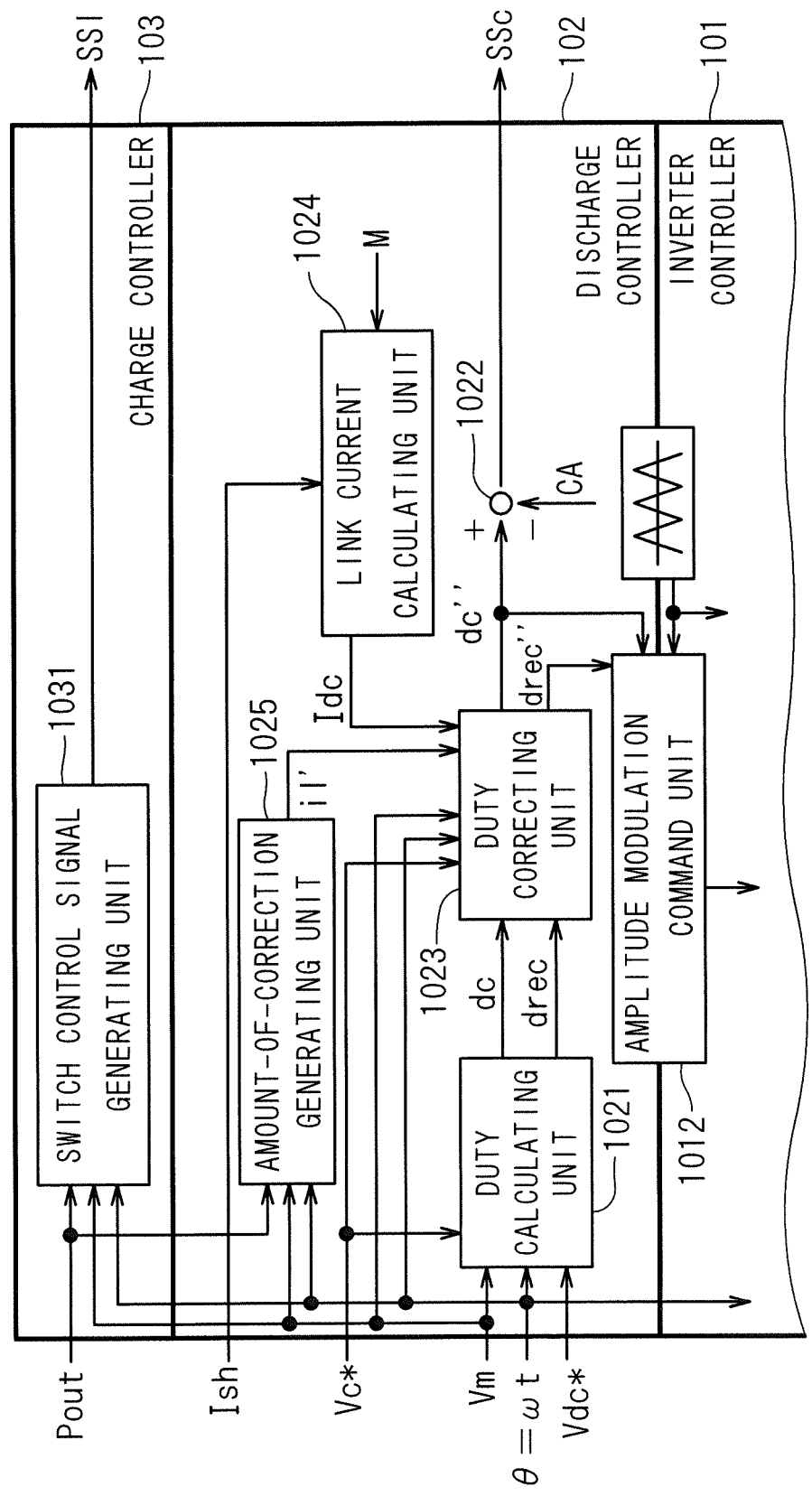
FIG. 24 is a block diagram exemplifying a first configuration of a discharge controller and its vicinity.

FIG. 24 is a block diagram exemplifying a first configuration of the discharge controller 102 for obtaining the rectification duty drec" and the discharge duty dc" and its vicinity. The discharge controller 102 constitutes the control device 10 together with the inverter controller 101 and the charge controller 103 illustrated in FIG. 2.

In FIG. 24, the discharge controller 102 includes an amount-of-correction generating unit 1025 in addition to the duty calculating unit 1021, the comparator 1022, the duty correcting unit 1023, and the link current calculating unit 1024 described using FIG. 2. Note that the duty correcting unit 1023 obtains the rectification duty drec" and the discharge duty dc" from the original rectification duty drec and the original discharge duty dc, respectively, in accordance with Equations (27) and (29) (particularly the first equality in each equation), respectively.

FIG. 25 is a block diagram exemplifying the configuration of the amount-of-correction generating unit 1025. The amount-of-correction generating unit 1025 includes an input current estimating unit 1025a and a correction harmonic table 1025b. The input current estimating unit 1025a calculates an estimated value Is of the input current Iin on the basis of the output power Pout, the amplitude Vm, and the phase ωt. For example, the following equation can be adopted.

[Math. 31]

$$Is = \frac{2 \cdot Pout}{Vm \cdot |\sin(\omega t)|} \quad (31)$$

The correction harmonic table 1025b stores therein a table showing the relationship between the input current Iin and the amount of control of harmonic components, searches the table while adopting the estimated value Is as the input current Iin, and outputs the corresponding amount of correction il'.

That is, in the first configuration, the amount of correction il' is calculated on the basis of the distortion of the input current Iin. Thus, in the first configuration, the reactor current il is not necessary for the control device 10.

Figure 26:
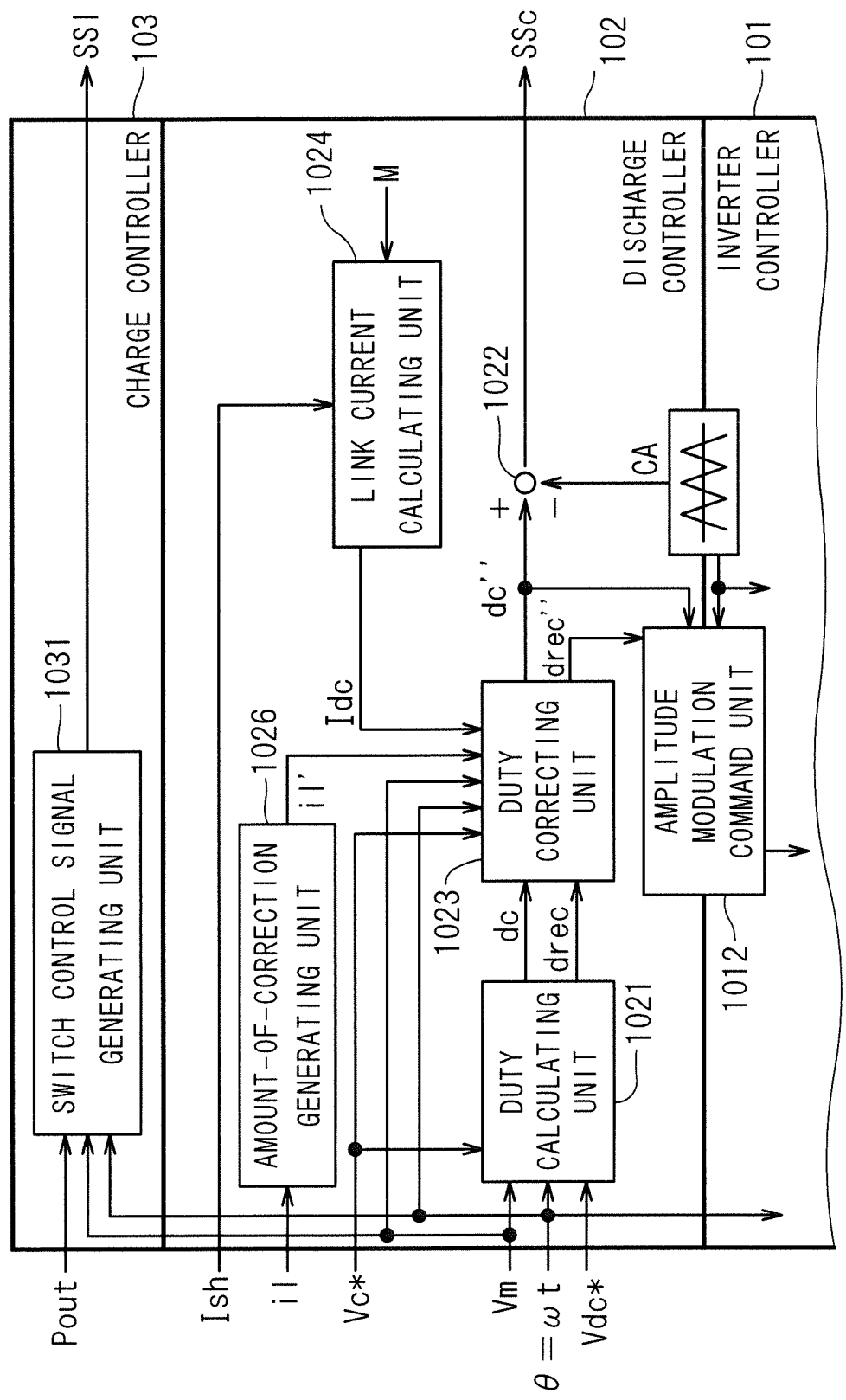
FIG. 26 is a block diagram exemplifying a second configuration of the discharge controller and its vicinity.

FIG. 26 is a block diagram exemplifying a second configuration of the discharge controller 102 for obtaining the rectification duty drec" and the discharge duty dc" and its vicinity. The discharge controller 102 also constitutes the control device 10 together with the inverter controller 101 and the charge controller 103 illustrated in FIG. 2.

In FIG. 26, the discharge controller 102 includes an amount-of-correction generating unit 1026 in addition to the duty calculating unit 1021, the comparator 1022, the duty correcting unit 1023, and the link current calculating unit 1024 described using FIG. 2. Note that the duty correcting unit 1023 obtains the rectification duty drec" and the discharge duty dc" in accordance with Equations (27) and (29) (particularly the first equality in each equation), respectively.

Figure 27:
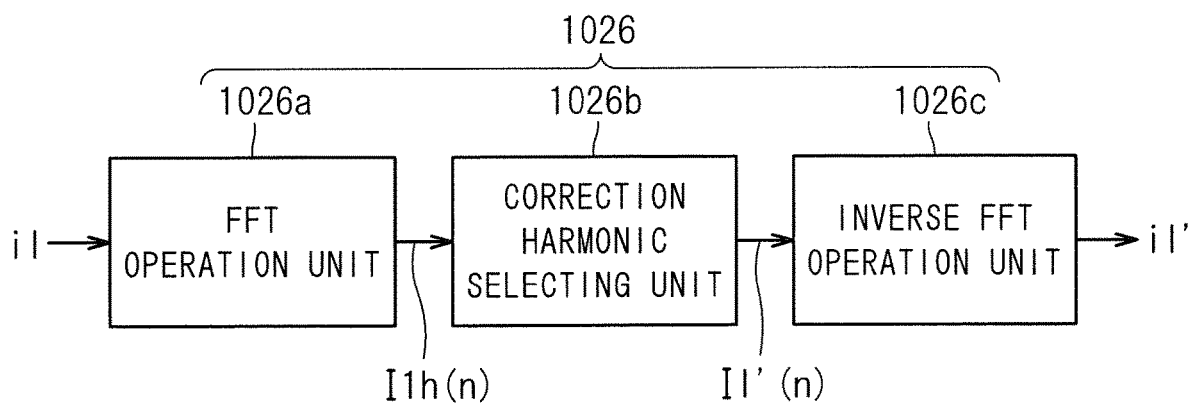
FIG. 27 is a block diagram exemplifying the configuration of an amount-of-correction generating unit.

FIG. 27 is a block diagram exemplifying the configuration of the amount-of-correction generating unit 1026. The amount-of-correction generating unit 1026 includes an FFT operation unit 1026a, a correction harmonic selecting unit 1026b, and an inverse FFT operation unit 1026c. The FFT operation unit 1026a performs fast Fourier transform on the reactor current il to calculate an amplitude Ilh(n) of each component of the n-th order frequency. The correction harmonic selecting unit 1026b selects the order of harmonics exceeding the upper limit that is set for each order. Subsequently, regarding the selected order (hereinafter referred to as α-th order), the correction harmonic selecting unit 1026b calculates the amount of the amplitude Ilh(α) of the α-th order harmonic component exceeding the upper limit that is set for the α-th order harmonic, as an amount of correction Il'(α) of the α-th order harmonic. An amount of correction Il'(β) (β≠α) of the order that is not selected is 0. The inverse FFT operation unit 1026c performs inverse fast Fourier transform by using the amount of correction Il'(n) or the amount of correction Il'(α) to calculate the amount of correction il'.

That is, in the second configuration, the amount of correction il' is calculated on the basis of the distortion of the reactor current il (see FIG. 15 and FIG. 20).

I. Modification (i-1) First Modification

Figure 28:
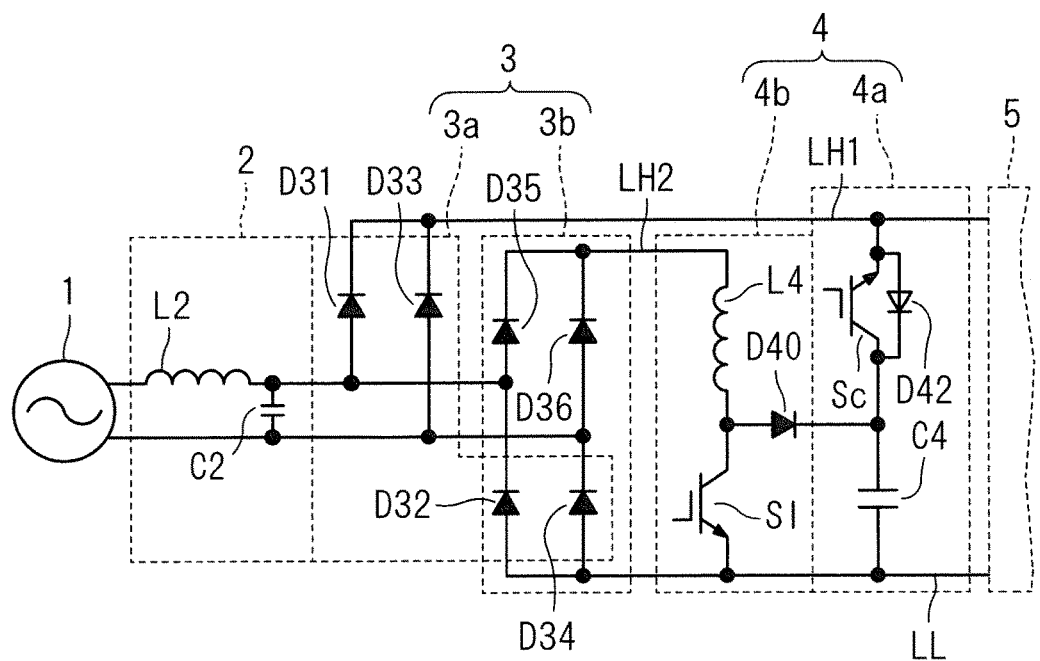
FIG. 28 is a circuit diagram illustrating a first modification.

FIG. 28 is a circuit diagram illustrating diode bridges 3a and 3b replacing the converter 3 and their vicinity as a first modification of the power converter. This configuration is known from, for example, Yamashita, Sakakibara, "A control method of a single-phase-to-three-phase power converter with an active buffer for increasing voltage transfer ratio", the Institute of Electrical Engineers of Japan Industry Applications Society Conference 2016, 1-54, pp. I-181 to I-186, 2016.

The diode bridge 3a includes, like the converter 3 described in the foregoing embodiment, the diodes D31, D32, D33, and D34, which constitute a bridge circuit. The diode bridge 3b includes diodes D35, D36, D32, and D34, which constitute a bridge circuit. That is, the diode bridges 3a and 3b share the diodes D32 and D34.

In this modification, the DC power supply line LH described in the foregoing embodiment is replaced with two DC power supply lines LH1 and LH2. On the other hand, the DC power supply line LL is connected to the anodes of the diodes D32 and D34, the switch Sl on the opposite side to the reactor L4, the capacitor C4 on the opposite side to the switch Sc, and the inverter 5, as in the foregoing embodiment.

The DC power supply line LH1 is connected to the cathodes of the diodes D31 and D33 in common, the switch Sc on the opposite side to the capacitor C4, and the inverter 5, like the DC power supply line LH. The DC power supply line LH2 is connected to the cathodes of the diodes D35 and D36 in common, and the reactor L4 on the opposite side to the switch Sl.

Thus, the supply of power to the DC power supply line LH1 from the diode bridge 3a and the discharge circuit 4a is equivalent to the supply of power to the DC power supply line LH in the foregoing embodiment from the converter 3 and the discharge circuit 4a. Also, the supply of power from the DC power supply line LH2 to the charge circuit 4b via the diode bridge 3b (the reception of power by the charge circuit 4b) is equivalent to the supply of power from the DC power supply line LH in the foregoing embodiment to the charge circuit 4b via the converter 3 (the reception of power by the charge circuit 4b).

As described above, the path for supplying power and the path for receiving power are different from each other, and thus the current blocking circuit 4c according to the foregoing embodiment is not necessary in the first modification.

(i-2) Second Modification

The current blocking circuit 4c also has a function of blocking the current flowing from the discharge circuit 4a toward the converter 3. Thus, the filter 2 can be disposed between the converter 3 and the current blocking circuit 4c.

Figure 29:
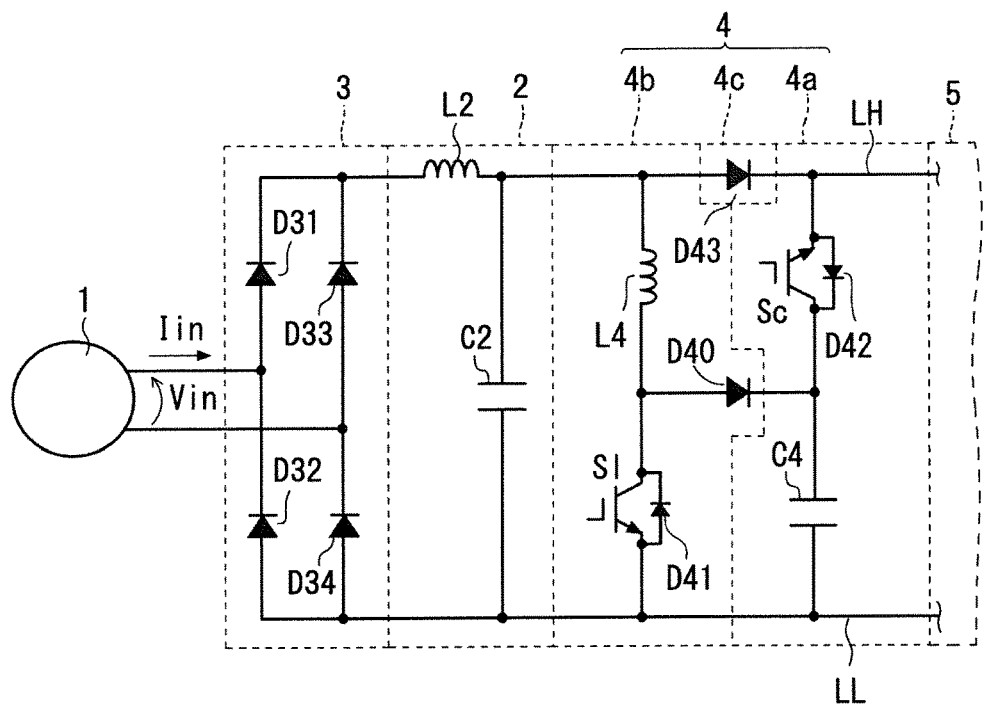
FIG. 29 is a circuit diagram illustrating the configuration on a single-phase AC power supply side respect to an inverter in a case where a filter is disposed on a converter and the inverter.
Figure 30:
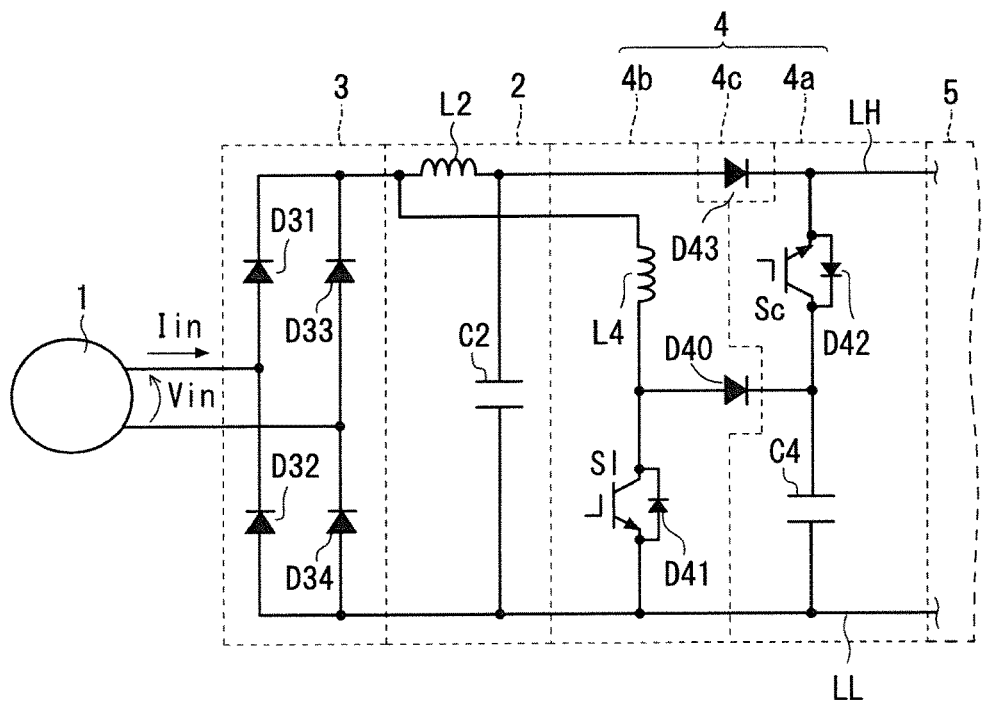
FIG. 30 is a circuit diagram illustrating the configuration on the single-phase AC power supply side respect to the inverter in a case where the filter is disposed between the converter and the inverter.

FIG. 29 and FIG. 30 are circuit diagrams each illustrating the configuration on the single-phase AC power supply 1 side respect to the inverter 5 in a case where the filter 2 is disposed between the converter 3 and the current blocking circuit 4c in the power converter.

In the configuration illustrated in FIG. 29, the reactor L2 is interposed between the converter 3 and the reactor L4. This configuration is known from, for example, Yamashita, Sakakibara, "A control method of a single-phase-to-three-phase power converter with an active buffer for increasing voltage transfer ratio", the Institute of Electrical Engineers of Japan Industry Applications Society Conference 2016, 1-54, pp. I-181 to I-186, 2016.

In the configuration illustrated in FIG. 30, the reactor L4 is connected to the converter 3-side end of the reactor L2. In other words, the filter 2 may be included in the charge circuit 4b although the filter 2 is disposed between the converter 3 and the current blocking circuit 4c.

Specifically, the reactor L2 is provided on the DC power supply line LH, at a position across the reactor L4 from the converter 3. The capacitor C2 is connected between the DC power supply lines LH and LL, at a position across the reactor L2 from the converter 3, and constitutes the filter together with the reactor L2.

Accordingly, it is clear that, even when the end farther from the diode D40 of the reactor L4 is connected between the reactor L2 and the converter 3, harmonics resulting from the switching operation of the inverter 5 do not propagate to the single-phase AC power supply 1.

The present invention has been described in detail. The description given above is an example in all aspects and the present invention is not limited thereto. It is understood that an unlimited number of modification examples not described here may be assumed without deviating from the scope of the present invention.

The invention claimed is:

1. A control device for controlling a direct power converter,
the direct power converter comprising:
a DC link including a first DC power supply line and a second DC power supply line;

a rectifying converter that receives a single-phase AC voltage and outputs a ripple power to the DC link;

a power buffer circuit that supplies and receives a power to and from the DC link; and an inverter that converts a DC voltage between the first DC power supply line and the second DC power supply line to an output AC voltage, the converter applying a rectified voltage obtained by full-wave rectifying the single-phase AC voltage to the DC link such that the first DC power supply line is higher in potential than the second DC power supply line, the control device comprising:

a duty generating unit that generates a rectification duty which is a duty at which a first current flows from the rectifying converter to the DC link and a discharge duty which is a duty at which a second current flows from the power buffer circuit to the DC link; and an inverter controller that outputs an inverter control signal that controls an operation of the inverter on the basis of the rectification duty, the discharge duty, and a command value of a voltage output from the inverter, the rectification duty being set on the basis of a product of a first ratio of a predetermined voltage to an amplitude of the single-phase AC voltage and an absolute value of a sinusoidal value of a phase of the single-phase AC voltage, and a second ratio of a third current to a DC current flowing through the inverter, the third current being a fourth current input to the power buffer circuit from the DC link or an amount of reduction of a harmonic component of the fourth current.

2. The control device for the direct power converter according to claim 1, wherein the rectifying converter applies the rectified voltage obtained by full-wave rectifying the single-phase AC voltage to the DC link such that the first DC power supply line is higher in potential than the second DC power supply line, the third current is the fourth current, the power buffer circuit includes a discharge circuit including a capacitor and a first switch that is connected in series to the capacitor between the first DC power supply line and the second DC power supply line and is closer to the first DC power supply line than the capacitor is, and a charge circuit that charges the capacitor, the control device outputs a discharge switch signal that brings the first switch into conduction on the basis of the discharge duty, and the discharge duty is set on the basis of a product of a third ratio of the predetermined voltage to a voltage across the capacitor and a cosine value of a value twice the phase of the single-phase AC voltage, and a product of a fourth ratio of the amplitude to the voltage across the capacitor, the second ratio, and the absolute value of the sinusoidal value.

3. The control device for the direct power converter according to claim 2, wherein the duty generating unit includes a duty calculating unit that obtains an original rectification duty, which is a product of the first ratio and the absolute value of the sinusoidal value, and an original discharge duty, which is a product of the third ratio and a square of a cosine value of the phase of the single-phase AC voltage, and a duty correcting unit that performs correction based on the second ratio to obtain the rectification duty from the original rectification duty and the discharge duty from the original discharge duty.

4. The control device for the direct power converter according to claim 3, wherein the charge circuit includes a diode including a cathode connected to the capacitor and an anode, a reactor connected between the first DC power supply line and the anode, and a second switch connected between the second DC power supply line and the anode, the control device further comprising a switch control signal generating unit that generates a control signal that causes the second switch to be turned on once and turned off once in one period of the rectified voltage.

5. The control device for the direct power converter according to claim 2, wherein the charge circuit includes a diode including a cathode connected to the capacitor and an anode, a reactor connected between the first DC power supply line and the anode, and a second switch connected between the second DC power supply line and the anode, the control device further comprising a switch control signal generating unit that generates a control signal that causes the second switch to be turned on once and turned off once in one period of the rectified voltage.

6. The control device for the direct power converter according to claim 1, wherein the rectifying converter applies the rectified voltage obtained by full-wave rectifying the single-phase AC voltage to the DC link such that the first DC power supply line is higher in potential than the second DC power supply line, the third current is the amount of reduction of the harmonic component of the fourth current, the power buffer circuit includes a discharge circuit including a capacitor and a first switch that is connected in series to the capacitor between the first DC power supply line and the second DC power supply line and is closer to the first DC power supply line than the capacitor is, and a charge circuit that charges the capacitor, the control device outputs a discharge switch signal that brings the first switch into conduction on the basis of the discharge duty, and the discharge duty is set on the basis of a product of a third ratio of the predetermined voltage to a voltage across the capacitor and a square of a cosine value of the phase of the single-phase AC voltage, and a product of a fourth ratio of the amplitude to the voltage across the capacitor, the second ratio, and the absolute value of the sinusoidal value.

7. The control device for the direct power converter according to claim 6, the control device further comprising an amount-of-correction generating unit that obtains the amount of reduction on the basis of a harmonic component of an input current input to the rectifying converter.

8. The control device for the direct power converter according to claim 7, wherein the duty generating unit includes a duty calculating unit that obtains an original rectification duty, which is a product of the first ratio and the absolute value of the sinusoidal value, and an original discharge duty, which is a product of the third ratio and a square of a cosine value of the phase of the single-phase AC voltage, and a duty correcting unit that performs correction based on the second ratio to obtain the rectification duty from the original rectification duty and the discharge duty from the original discharge duty.

9. The control device for the direct power converter according to claim 8, wherein
the charge circuit includes
a diode including a cathode connected to the capacitor and an anode,
a reactor connected between the first DC power supply line and the anode, and
a second switch connected between the second DC power supply line and the anode,
the control device further comprising a switch control signal generating unit that generates a control signal that causes the second switch to be turned on once and turned off once in one period of the rectified voltage.

10. The control device for the direct power converter according to claim 7, wherein
the charge circuit includes
a diode including a cathode connected to the capacitor and an anode,
a reactor connected between the first DC power supply line and the anode, and
a second switch connected between the second DC power supply line and the anode,
the control device further comprising a switch control signal generating unit that generates a control signal that causes the second switch to be turned on once and turned off once in one period of the rectified voltage.

11. The control device for the direct power converter according to claim 6, the control device further comprising an amount-of-correction generating unit that obtains the amount of reduction on the basis of the harmonic component of the fourth current.

12. The control device for the direct power converter according to claim 11, wherein
the duty generating unit includes
a duty calculating unit that obtains an original rectification duty, which is a product of the first ratio and the absolute value of the sinusoidal value, and an original discharge duty, which is a product of the third ratio and a square of a cosine value of the phase of the single-phase AC voltage, and
a duty correcting unit that performs correction based on the second ratio to obtain the rectification duty from the original rectification duty and the discharge duty from the original discharge duty.

13. The control device for the direct power converter according to claim 12, wherein
the charge circuit includes
a diode including a cathode connected to the capacitor and an anode,
a reactor connected between the first DC power supply line and the anode, and
a second switch connected between the second DC power supply line and the anode,
the control device further comprising a switch control signal generating unit that generates a control signal that causes the second switch to be turned on once and turned off once in one period of the rectified voltage.

14. The control device for the direct power converter according to claim 11, wherein
the charge circuit includes
a diode including a cathode connected to the capacitor and an anode,
a reactor connected between the first DC power supply line and the anode, and
a second switch connected between the second DC power supply line and the anode,
the control device further comprising a switch control signal generating unit that generates a control signal that causes the second switch to be turned on once and turned off once in one period of the rectified voltage.

15. The control device for the direct power converter according to claim 6, wherein
the duty generating unit includes
a duty calculating unit that obtains an original rectification duty, which is a product of the first ratio and the absolute value of the sinusoidal value, and an original discharge duty, which is a product of the third ratio and a square of a cosine value of the phase of the single-phase AC voltage, and
a duty correcting unit that performs correction based on the second ratio to obtain the rectification duty from the original rectification duty and the discharge duty from the original discharge duty.

16. The control device for the direct power converter according to claim 15, wherein
the charge circuit includes
a diode including a cathode connected to the capacitor and an anode,
a reactor connected between the first DC power supply line and the anode, and
a second switch connected between the second DC power supply line and the anode,
the control device further comprising a switch control signal generating unit that generates a control signal that causes the second switch to be turned on once and turned off once in one period of the rectified voltage.

17. The control device for the direct power converter according to claim 6, wherein
the charge circuit includes
a diode including a cathode connected to the capacitor and an anode,
a reactor connected between the first DC power supply line and the anode, and
a second switch connected between the second DC power supply line and the anode,
the control device further comprising a switch control signal generating unit that generates a control signal that causes the second switch to be turned on once and turned off once in one period of the rectified voltage.

* * * * *